(12) United States Patent
Goto

(10) Patent No.: US 7,328,002 B2
(45) Date of Patent: Feb. 5, 2008

(54) COMMUNICATIONS TERMINAL, COMMUNICATION CONTROL METHOD AND PROGRAM

(75) Inventor: Yoshihiro Goto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 228 days.

(21) Appl. No.: 11/117,969

(22) Filed: Apr. 29, 2005

(65) Prior Publication Data

US 2005/0255835 A1    Nov. 17, 2005

(30) Foreign Application Priority Data

May 14, 2004  (JP)  ............................ 2004-144364

(51) Int. Cl.
   *H04M 11/00*   (2006.01)
(52) U.S. Cl. .............. 455/407; 379/265.02; 455/556.1; 455/456.4; 455/461
(58) Field of Classification Search ................. 455/407
   See application file for complete search history.

(56) References Cited

U.S. PATENT DOCUMENTS

| 6,885,877 | B1 * | 4/2005 | Ozaki et al. .............. 455/556.1 |
| 2002/0164011 | A1 * | 11/2002 | Stumer et al. ......... 379/265.02 |
| 2004/0077359 | A1 * | 4/2004 | Bernas et al. ............ 455/456.1 |
| 2005/0136949 | A1 * | 6/2005 | Barnes, Jr. .................. 455/461 |
| 2006/0246870 | A1 * | 11/2006 | Jeong ......................... 455/407 |

FOREIGN PATENT DOCUMENTS

| EP | 1 017 029 A2 | 7/2000 |
| JP | 2003-187334 A | 7/2003 |
| JP | 2003-242229 A | 8/2003 |
| JP | 2003-256520 A | 9/2003 |
| JP | 2004-110577 A | 4/2004 |
| KR | 1020020010160 A | 2/2002 |
| KR | 1020020061343 A | 7/2002 |
| WO | WO 01/71627 A2 | 9/2001 |
| WO | WO0171627 A2 * | 9/2001 |
| WO | WO 03/094375 A1 | 11/2003 |

* cited by examiner

*Primary Examiner*—Lester G. Kincaid
*Assistant Examiner*—Diego Herrera
(74) *Attorney, Agent, or Firm*—Frishauf, Holtz, Goodman & Chick, P.C.

(57) ABSTRACT

Wireless electronic payment of a cellular phone to a commercial company for commodities and/or services, received from the company, through the company's register and a non-contact IC of the cellular phone is protected from being hindered by an incoming call or mail received by the cellular phone. To this end, an RF block of the cellular phone detects the incoming call or mail received externally over a communication line. The non-contact IC pays wirelessly and electronically for the commodities and/or services received from the company. If a CPU of the cellular phone is responsive to the RF block detecting the incoming call or mail when the non-contact IC is not performing the paying process for going to a telephone-call establishment process based on an off-hook operation in response to the incoming call. The CPU also automatically answers an external incoming call or mail when the non-contact IC is performing the paying process for producing a hold tone and sends it to the other party, thereby preventing going to a telephone-call establishment process for the incoming call.

7 Claims, 18 Drawing Sheets

COMMUNICATIONS TERMINAL, COMMUNICATION CONTROL METHOD AND PROGRAM

CROSS-REFERENCE TO RELATED APPLICATIONS

This application is based upon and claims the benefit of priority from the prior Japanese Patent Application No. 2004-144364, filed May 14, 2004, the entire contents of which are incorporated herein by reference.

BACKGROUND OF THE INVENTION

1. Field of the Invention

The present invention relates to communications terminals, communication control methods and programs, and more particularly to such apparatus, methods and programs with which users of the communications terminals who purchased commodities and/or services from stores or the like pay the same electronically and wirelessly for the commodities and/or services.

2. Description of the Related Art

Non-contact ICs or IC tags that send/receive information in a non-contact manner are watched as new electronic devices. Since the non-contact IC is furthermore smaller than a general IC card, it can be easily housed within a small communications terminal such as a cellular phone, a PHS or a PDA (Personal Digital Assistant). Thus, account settlement systems are proposed in which a non-contact IC housed within the small communications terminal is connected by a wireless communications channel, for example of an ISM (Industry Science Medical) band, to an account settlement machine installed in a store such that a user of the communications terminal can pay the store for commodities and/or service that the user received.

For example, Unexamined Patent Japanese Publication No. 2003-187334 discloses an account settlement system in which a user of a cellular phone pays for his or her purchased commodities in a credit card in a reduced time. In this system, when purchasing commodities, the user stores commodity information, including a commodity identifier for identifying the commodities uniquely, into his or her cellular telephone or IC tag which has already stored his or her customer ID information, and then sends the customer ID and commodity information to the account settlement machine.

Unexamined Japanese Patent Publication No. 2004-110577 discloses a lumpsum charging system in which a travel agency makes arrangements for transport facilities and hotels for the respective staff members of a corporation such as a company, reserves them for the staff members, using their personal IDs stored on their respective magnetic cards, IC cards, noncontact IC tags and/or cellular phones, and then collectively charges the corporation for the transportation, traveling and hotel expenses that the respective staff members must bear.

Unexamined Japanese Patent Publication No. 2003-242229 discloses a building tenant support system in which a service provider provides the tenants with various services, using information that identifies the respective tenants outputted from their short-distance wireless devices using the ISM band, wireless devices using a cellular phone band, wireless devices using a PHS band, and/or non-contact IC tags using a wireless frequency band.

When a user of a cellular phone who purchased commodities/services from a store or the like receives an incoming call or e-mail during paying the store or the like wirelessly for the commodities and/or services, using a non-contact IC housed within the cellular phone, the user would probably hastily perform such a wrong paying operation that wireless communication between the non-contact IC and an account settlement system stored within the store or the like is hindered by an on-hook operation on the call or an auto-answering operation on the e-mail. On the other hand, the other party would feel uneasy when the user does not answer the call though the other party can hear the ring tone.

SUMMARY OF THE INVENTION

It is therefore an object of the present invention to prevent payment for commodities/services, which a user of a communications terminal received from a commercial enterprise, through wireless communication from a non-contact IC housed within the communications terminal to an account settlement machine provided in the commercial enterprise from being hindered by an incoming telephone call or e-mail for the communications terminal.

According to one aspect of the present invention, a communications terminal detects an incoming call or e-mail received externally over a predetermined communication line and wirelessly and electronically performs a paying process for a commercial enterprise, which provided commodities and/or services for a user of the communications terminal, at the request of the commercial enterprise. Furthermore, the communication terminal is responsive to detecting an incoming call or e-mail received externally when the paying process is not being performed for causing the communications terminal to go to a communication establishment process between the communications terminal and the other party, and responsive to detecting an incoming call or e-mail received externally when the paying process is being performed for inhibiting the communications terminal from going to the communication establishment process between the communications terminal and the other party.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DESCRIPTION OF THE EMBODIMENTS

First-third embodiments of the inventive communications terminal in the form of a cellular phone will be described with reference to the drawings.

Figure 1:
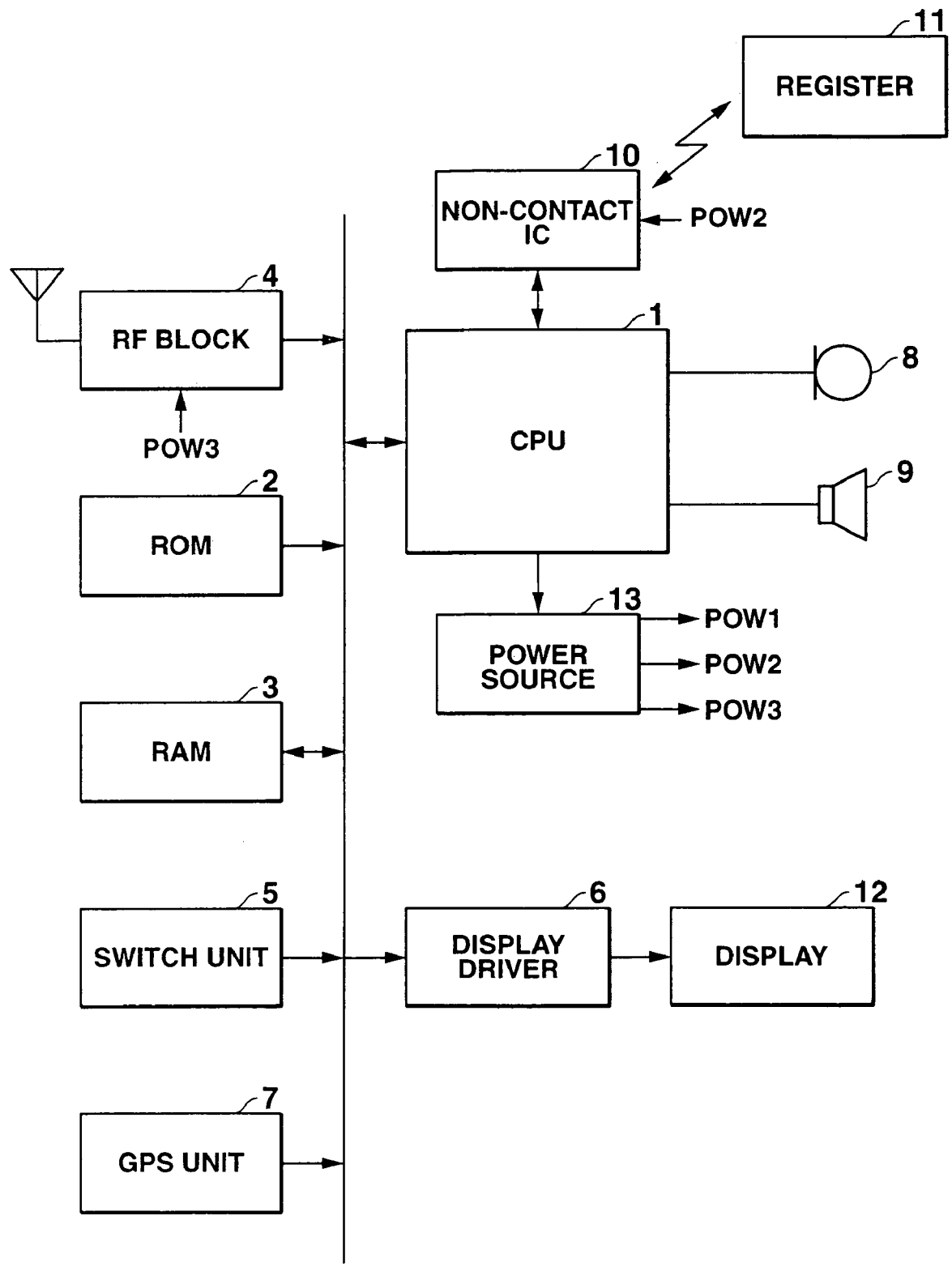
FIG. 1 illustrates a charge payment system comprising a communication device in the form of a cellular phone in each of embodiments of the present invention.

FIG. 1 illustrates the composition of a charge payment system including the cellular phone in each of the embodiments. In FIG. 1, CPU 1 is composed of a one-chip IC that includes a built-in DSP (Digital Signal Processor) for processing a baseband signal. CPU 1 is connected via a system bus to ROM 2, RAM 3, RF block 4, a switch unit 5, a display driver 6 and a GPS unit 7. CPU 1 send/receives commands to/from these elements to control the cellular phone. CPU 1 is connected at its input and output ports to a microphone 8 and a speaker 9, respectively.

CPU 1 is further connected via a dedicated communication bus to a non-contact IC 10 housed within the cellular phone. The non-contact IC 10 electronically pays a register 11, or an account settling machine, installed in a store or the like for commodities/services that the user received from the store, using a wireless communication channel with the ISM band. The non-contact IC 10 includes a CPU, a program ROM, and a data RAM as a non-volatile memory (which are not shown). The data RAM has stored data on a deposit in the user's account at a financial institution from which the user can pay electronically. Setting and updating the deposit can be permitted only by the financial institution.

ROM 2 has stored a communication control program that fulfills the functions of making telephonic communication with and sending/receiving e-mails to/from another cellular phone, controlling the respective elements connected to the system bus, and sending/receiving commands/data to/from the non-contact IC 10. RAM 3 includes a working area that temporarily stores data processed/to be processed by CPU 1 and includes areas for various registers and flags required for executing the communication control program, a receiving and a sending box that record received and sent mails, respectively, an area for a receipt database (DB) that holds receipts on the sums of money paid by the non-contact IC 10. Although not shown, RF block 4 includes a wireless transceiver unit and a wireless signal processor that send/receive calls/e-mails to/from a telephone communications network.

The switch unit 5 includes a power source switch, an off-hook switch, an on-hook switch, a mail switch, a call origination switch, an OK switch, a cursor switch unit, an alphanumeric input switch, a payment switch, a receipt switch, a calendar switch, a hold switch, a sum switch, a clear switch, a submenu switch and other switches. The display driver 6 is connected to a display 12 composed, for example, of a LCD (Liquid Crystal-equipped Display) so as to display a menu picture in accordance with operation of the switch unit 5. Some of the switches each have a plurality of functions to fulfill depending on their respective states. Some switches are in the form of icon switches displayed on the display 12 to fulfill their respective functions. The respective functions of those switches will be described in detail later.

The speaker 9 produces dial and ring tones respectively when the user makes and gets telephone calls to and from the other party. The speaker 9 is also used along with the microphone 8 in the telephone-call establishment process.

The power source 13 has three power supply routes POW 1, POW 2 and POW 3 that supply power to the respective relevant components of the cellular phone. The power supply route POW 2 is connected only to the non-contact IC 10; the power route POW 3 only to the RF block 4; and the power route POW 1 to the other components including CPU 1. When the power source switch is turned on, the power supply routes POW 1 and POW 3 become alive. After CPU 1 has started its operation by making the power route POW 1 alive, each of the power routes POW 2 and POW 3 is made alive and dead by CPU 1. That is, each of the non-contact IC 10 and the RF block 4 is turned on/off by CPU 1.

Figure 2:
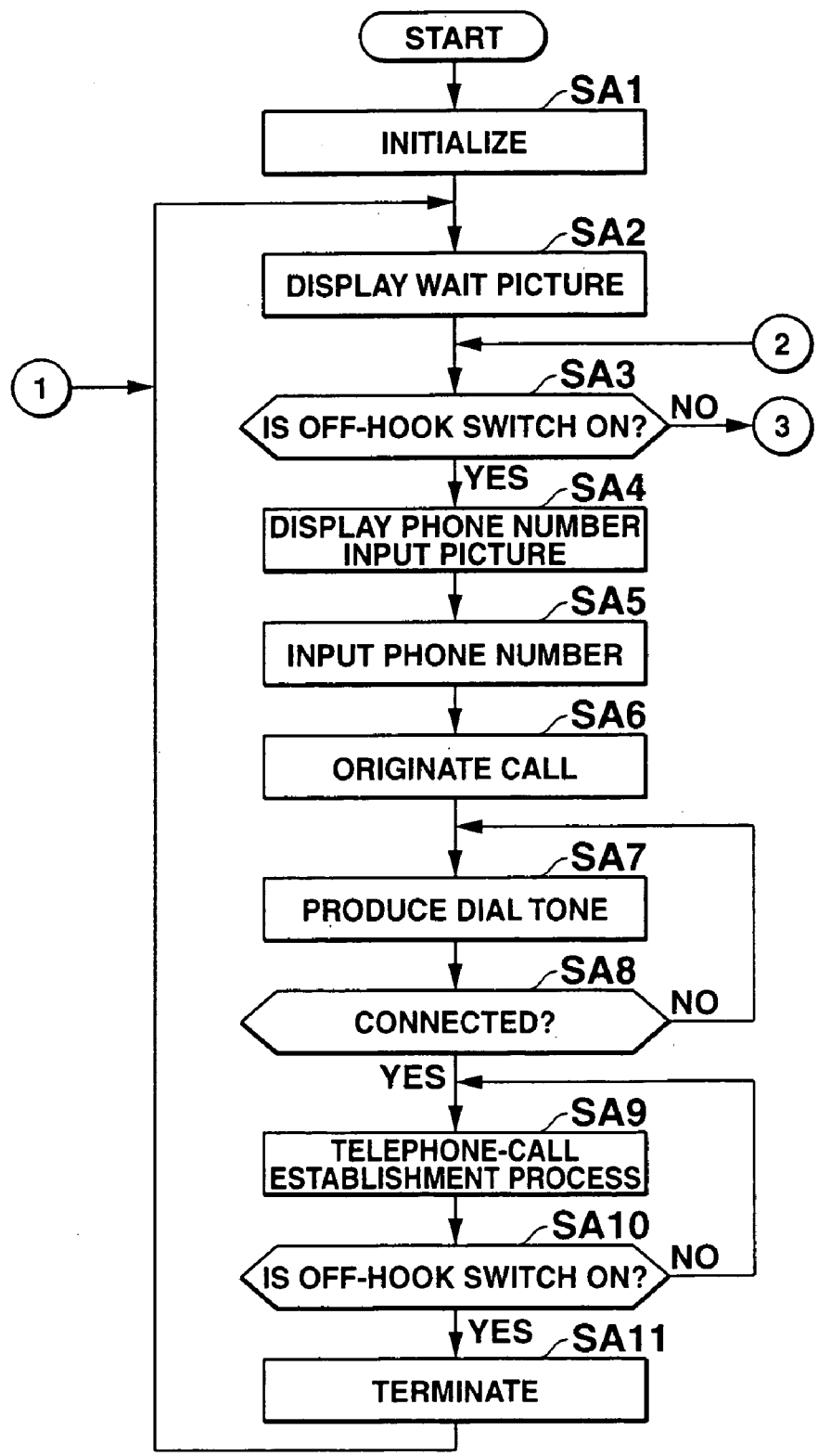
FIG. 2 is a part of a flowchart indicative of a main routine to be performed by the cellular phone in the first embodiment.

Operation of the first embodiment of FIG. 1 will be described next. FIGS. 2-6 are a flowchart of a main routine to be performed by CPU 1 of the first embodiment. In FIG. 2, CPU 1 performs a predetermined initialization process (step SA1) and then displays a wait picture on the display 12 (step SA2). Then, CPU 1 determines whether the off-hook switch is turned on (step SA3). If so, CPU 1 displays a phone-number inputting picture (step SA4), stores the inputted number in RAM 3 and then displays it on the display 12 (step SA5). Then, CPU 1 performs a call origination process in accordance with turning on of the call origination switch (step SA6), and then causes the speaker 9 to produce a ring tone (step SA7). Then, CPU 1 determines whether the line connection is established (step SA8). If so, CPU 1 goes to a telephone-call establishment process (step SA9), thereby allowing the user to talk with the other party. Then, CPU 1 determines whether the on-hook switch is turned on (step SA10). If so, CPU 1 performs a telephone-call termination process including cutting the connection line (step SA11) and then goes to step SA2, thereby displaying the wait picture again.

Figure 3:
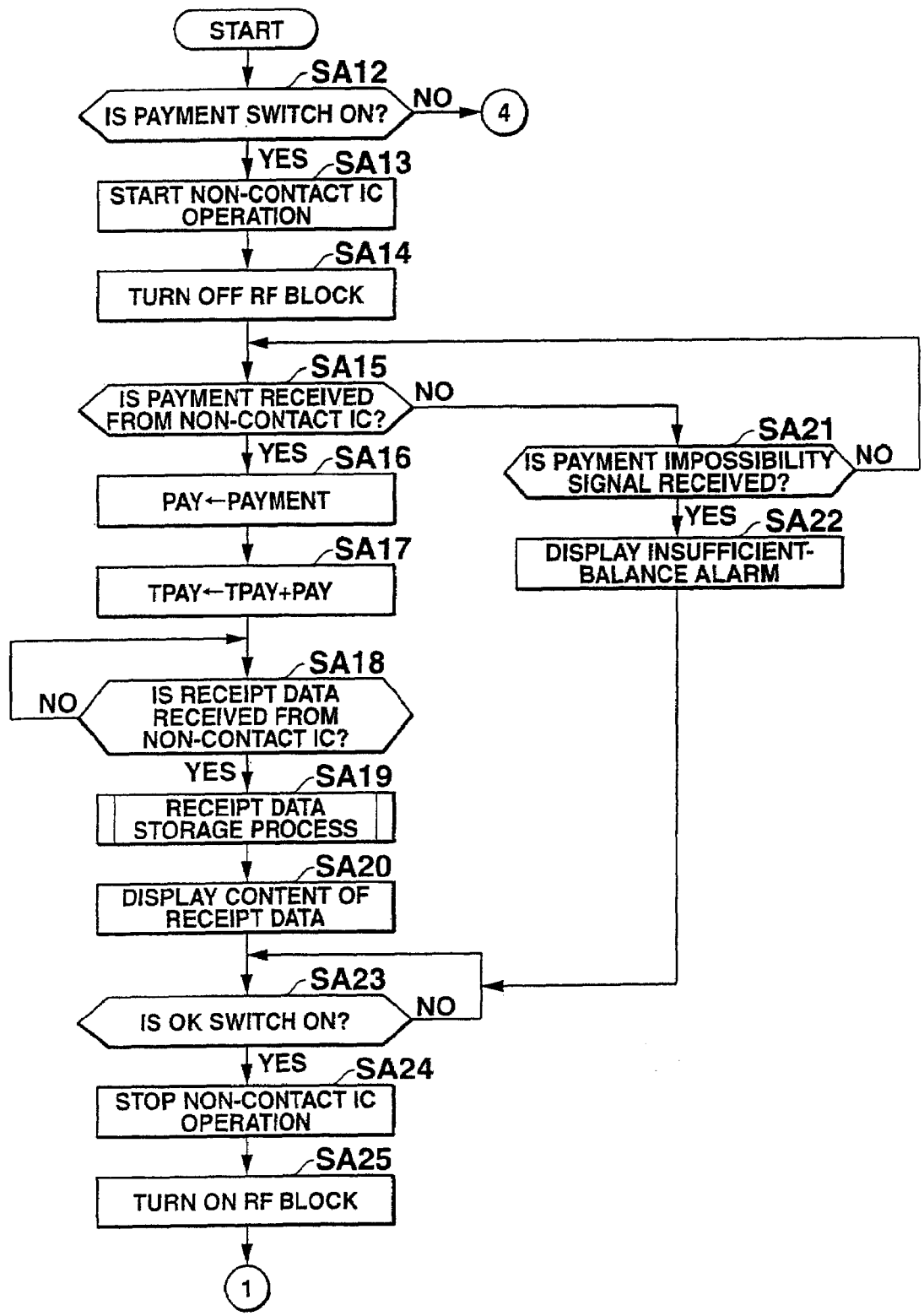
FIG. 3 is a second part of the flowchart continued to FIG. 2.

If the off-hook switch is not turned on in step SA3, CPU 1 determines whether the payment switch is turned on in step SA12 of FIG. 3. If so, CPU 1 makes POW 2 alive to start operation of the non-contact IC 10 (step SA13), and then makes POW 3 dead, thereby turning off the RF block 4 (step SA14).

Then, CPU 1 determines whether the cellular phone has received from the non-contact IC 10 a payment for commodities or services that the user of the cellular phone has purchased from a specified store (step SA15). If so, CPU 1 stores data on the payment in a register PAY of RAM 3 (step SA16). Furthermore, CPU 1 adds the payment to a sum of money whose data is stored in a register TPAY and then updates the data in the TPAY (step SA17). Then, CPU 1 determines whether receipt data is received from the noncontact IC 10 (step SA18). If so, CPU 1 stores a receipt data storage process (step SA19), and then displays the content of the receipt data (step SA20).

If not in step SA15, CPU 1 determines whether a payment impossibility signal is received (step SA21). If so, CPU 1 displays an alarm indicating that the balance at the financial institution is insufficient (step SA22).

After CPU 1 has displayed the content of the receipt data in step SA20 or the alarm in step SA22, CPU 1 determines whether the OK switch is turned on (step SA23). If so, CPU 1 stops operation of the non-contact IC 10 (step SA24), turns on the RF block 4 (step SA25), and then goes to step SA2 of FIG. 2, thereby displaying the wait picture.

Figure 4:
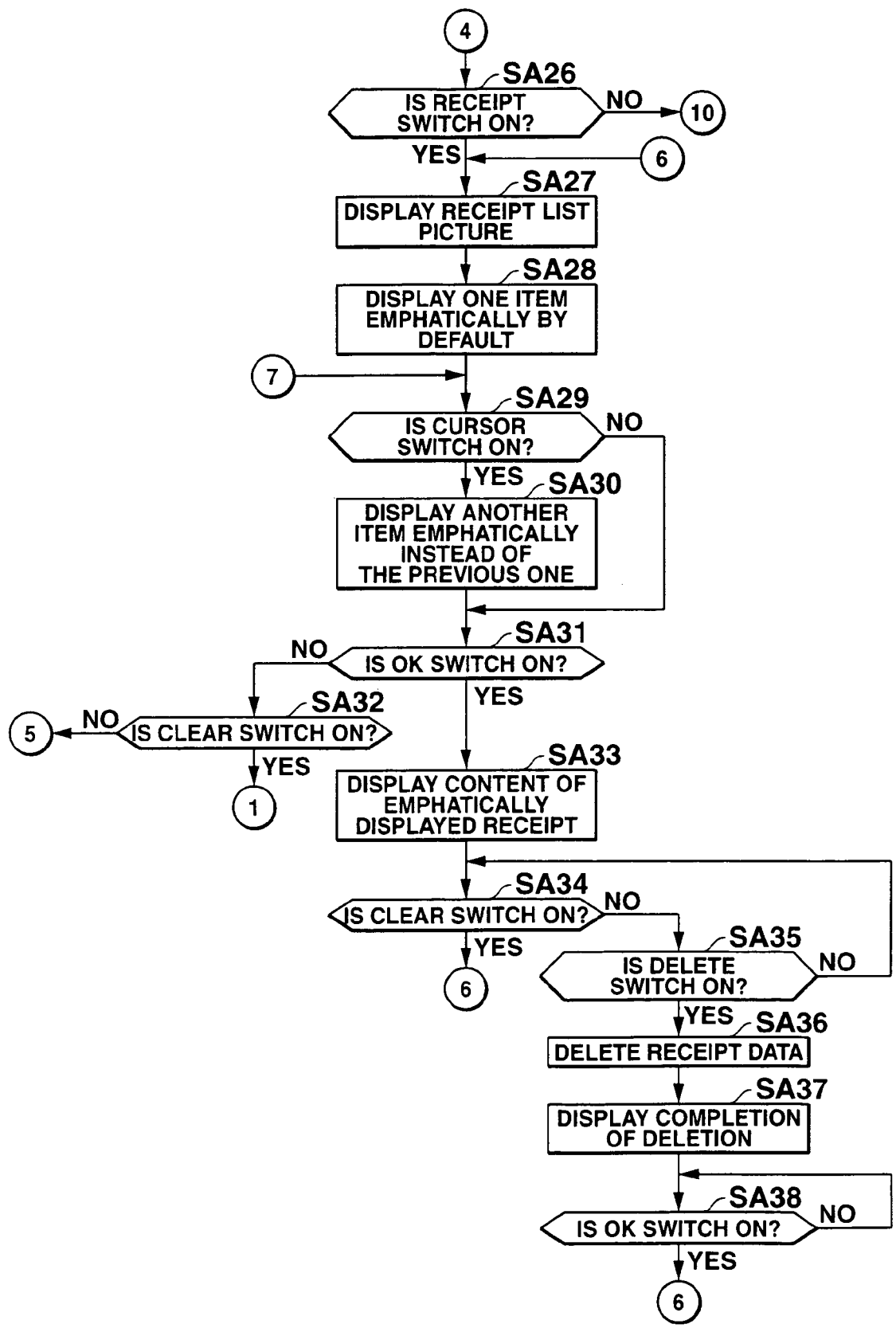
FIG. 4 is a third part of the flowchart continued to FIG. 3.

If the payment switch is not on in step SA12 of FIG. 3, CPU 1 determines whether the receipt switch is turned on (step SA26 in FIG. 4). If so, CPU 1 displays a receipt list picture (step SA27). The receipt list picture includes a plurality of items of the receipt list stored in the receipt database of RAM 3 and a plurality of icons indicative of the OK switch, clear switch and submenu switch. When the receipt list does not fit in one picture, it can be scrolled in a displayed state by the cursor switch. One of the plurality of items of the displayed receipt list is displayed emphatically, or in an inverted manner, by default to distinguish that item from the others (step SA28).

Then, CPU 1 determines whether the cursor switch is turned on (step SA29). If so, CPU 1 in turn displays another item emphatically (step SA30). CPU 1 then determines whether the OK switch displayed on the picture is turned on (step SA31). If not, CPU 1 determines whether the clear switch is turned on (step SA32). If so, CPU 1 erases the receipt list picture, and then goes to step SA2 of FIG. 2, thereby displaying the wait picture.

When the OK switch is turned on in step SA 31 of FIG. 4, CPU 1 displays the content of the receipt displayed emphatically at that time (step SA33). This picture also includes the icons indicative of the OK switch, clear switch and delete switch. Then, CPU 1 determines whether the clear switch is turned on (step SA34). If so, CPU 1 erases the picture indicative of the receipt content and then goes to step SA27, thereby displaying the receipt list picture. If the clear switch is not turned on, CPU 1 determines whether the delete switch is turned on (step SA35). If so, CPU 1 deletes the displayed receipt data (step SA36), and then displays completion of the deletion (step SA37). Then, CPU 1 determines whether the OK switch is turned on (step SA38). If so, CPU 1 goes to step SA27, thereby displaying the receipt list picture.

Figure 5:
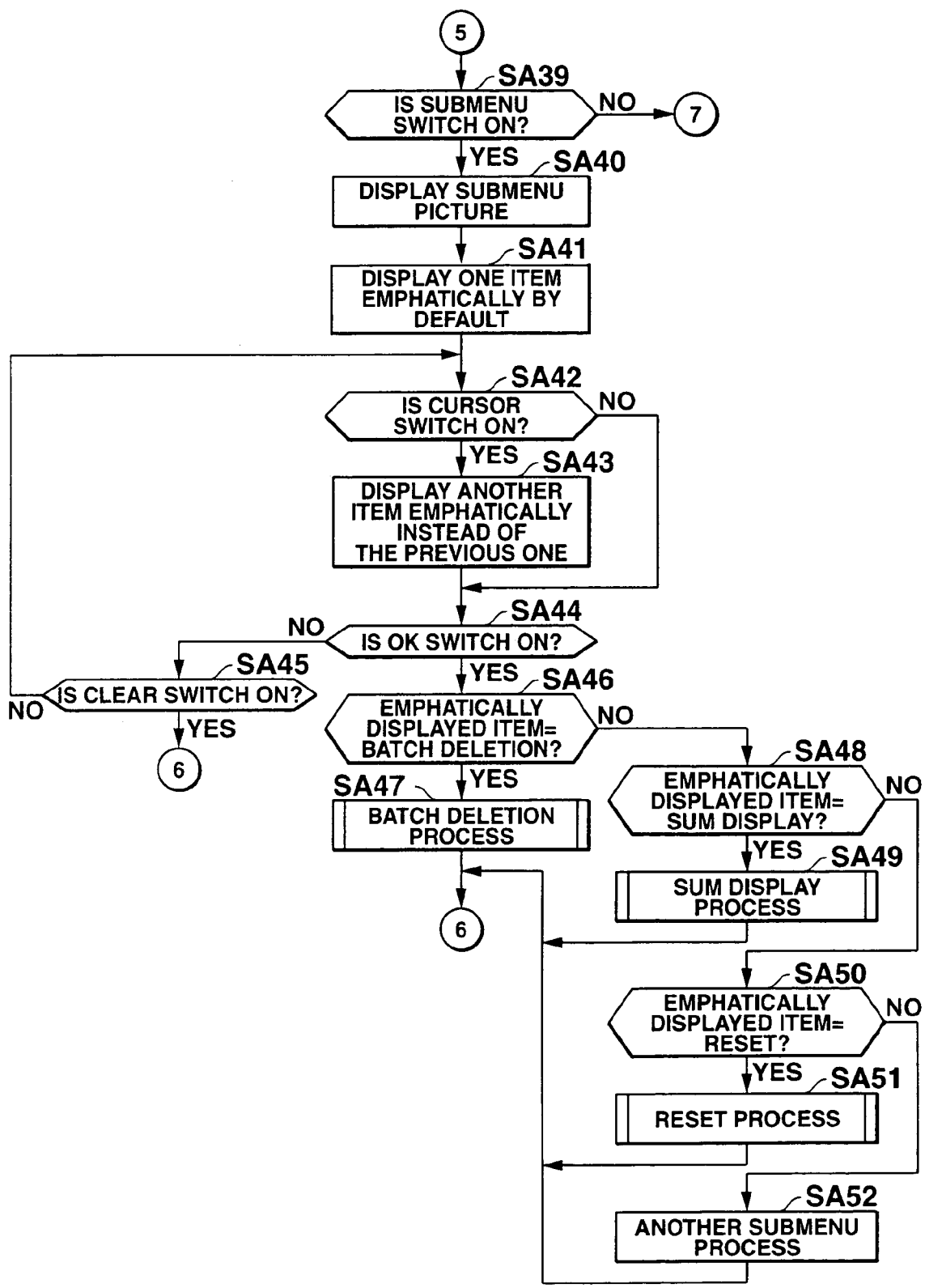
FIG. 5 is a fourth part of the flowchart continued to FIG. 4.

If the clear switch is not turned on in step SA32, CPU 1 determines whether the submenu switch displayed on the receipt list picture is turned on in step SA39 in FIG. 5. If so, CPU 1 displays the submenu picture (step SA40). The submenu picture includes a plurality of items "batch deletion", "sum display", "reset" and other submenus, and two icons of the OK switch and the clear switch. CPU 1 then displays one item emphatically by default (step SA41).

Then, CPU 1 determines whether the cursor switch is turned on (step SA42). If so, CPU 1 in turn displays another item emphatically (step SA43). CPU 1 then determines whether the OK switch is turned on (step SA44). If not, CPU 1 determines whether the clear switch is turned on (step SA45). If so, CPU 1 then erases the submenu picture, and then goes to step SA27 of FIG. 4, thereby displaying the receipt list picture.

When the OK switch is turned on in step SA44 of FIG. 5, CPU 1 determines whether "batch deletion" is displayed emphatically (step SA46). If so, CPU 1 performs the batch deletion process (step SA47). If not, CPU 1 determines whether "sum display" is displayed emphatically (step SA48). If so, CPU 1 performs a sum display process (step SA49). If not, CPU 1 determines whether "reset" is displayed emphatically (step SA50). If so, CPU 1 performs a reset process (step SA51). If not, CPU 1 performs a process for another submenu item emphatically displayed (step SA52). Then, CPU 1 goes to step SA27 of FIG. 4, thereby displaying the receipt list picture. When the submenu switch is not on in step SA39 of FIG. 5, CPU 1 goes to step SA29 of FIG. 4, thereby determining whether the cursor switch is on.

Figure 6:
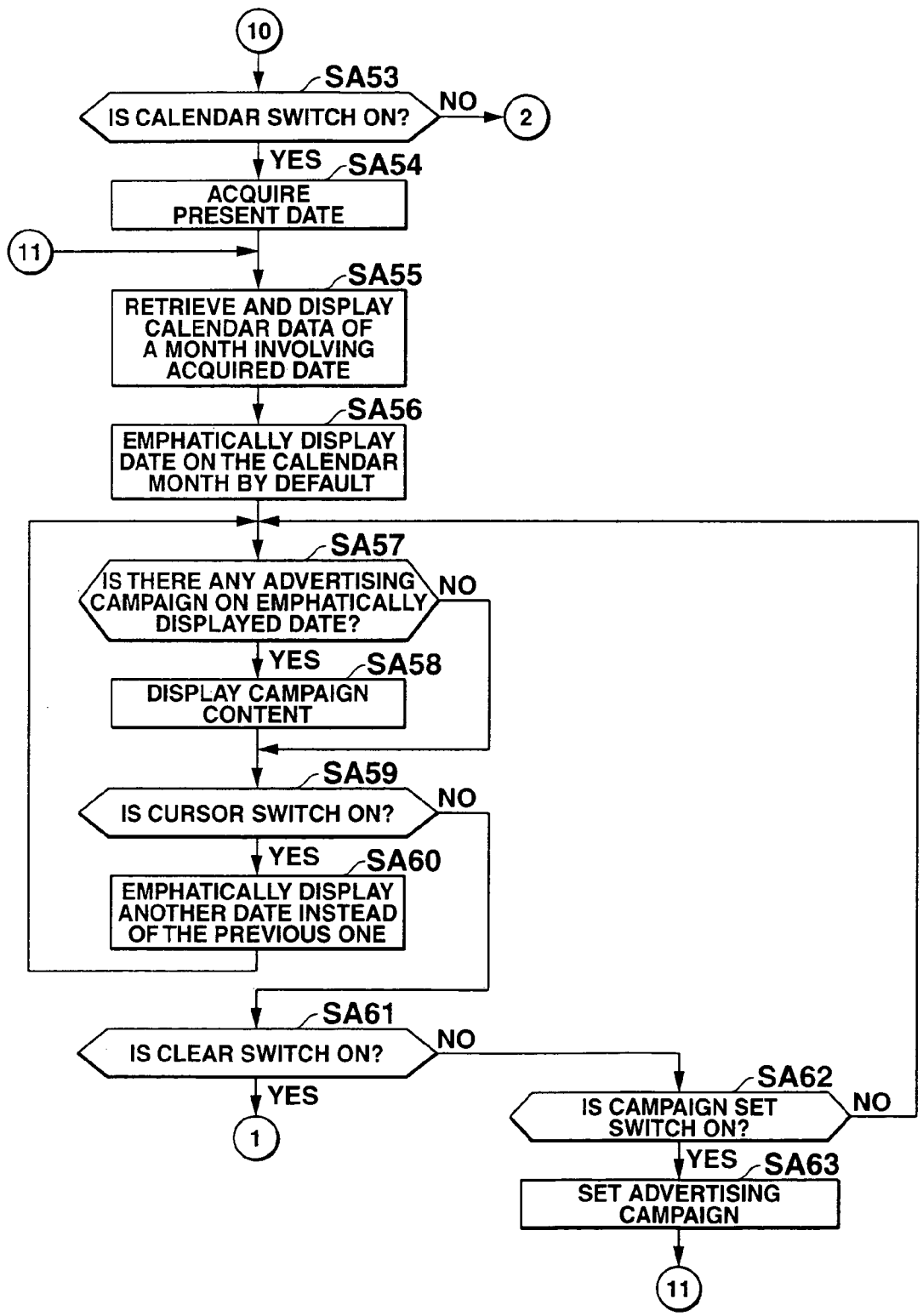
FIG. 6 is a fifth part of the flowchart continued to FIG. 4.

When the receipt switch is not on in step SA26 of FIG. 4, CPU 1 determines whether the calendar switch is turned on in step SA53 of FIG. 6. If not, or any one of the switches of the switch unit 5 is not on, CPU 1 goes to step SA3 of FIG. 2, thereby determining whether the off switch is on.

When the calendar switch is turned on, CPU 1 acquires data on the present date (step SA54), and retrieves and displays calendar data involving a month that includes the acquired date (step SA55). Furthermore, CPU 1 emphatically displays the acquired date on the calendar (step SA56). This calendar picture also displays the clear switch and the schedule setting switch.

Then, CPU 1 determines whether there is the store's advertising campaign on the emphatically displayed date (step SA57). If so, CPU 1 displays the content of the campaign (step SA58). If not or after displaying the campaign on the emphatically displayed date, CPU 1 determines whether the cursor switch is turned on (step SA59). If so, CPU 1 emphatically displays another item instead of the previous one (step SA60), and then goes to step SA57. If the cursor switch is not on, CPU 1 determines whether the clear switch is turned on (step SA61). If not, CPU 1 determines whether the campaign set switch is turned on (step SA62). If so, CPU 1 performs a campaign information set process (step SA63). After the campaign set process, CPU 1 goes to step SA55, thereby retrieving and again displaying calendar data involving a month that includes the acquired date.

When the clear switch is turned on in step SA61, CPU 1 goes to step SA2 of FIG. 2, thereby displaying the wait picture.

Figure 7:
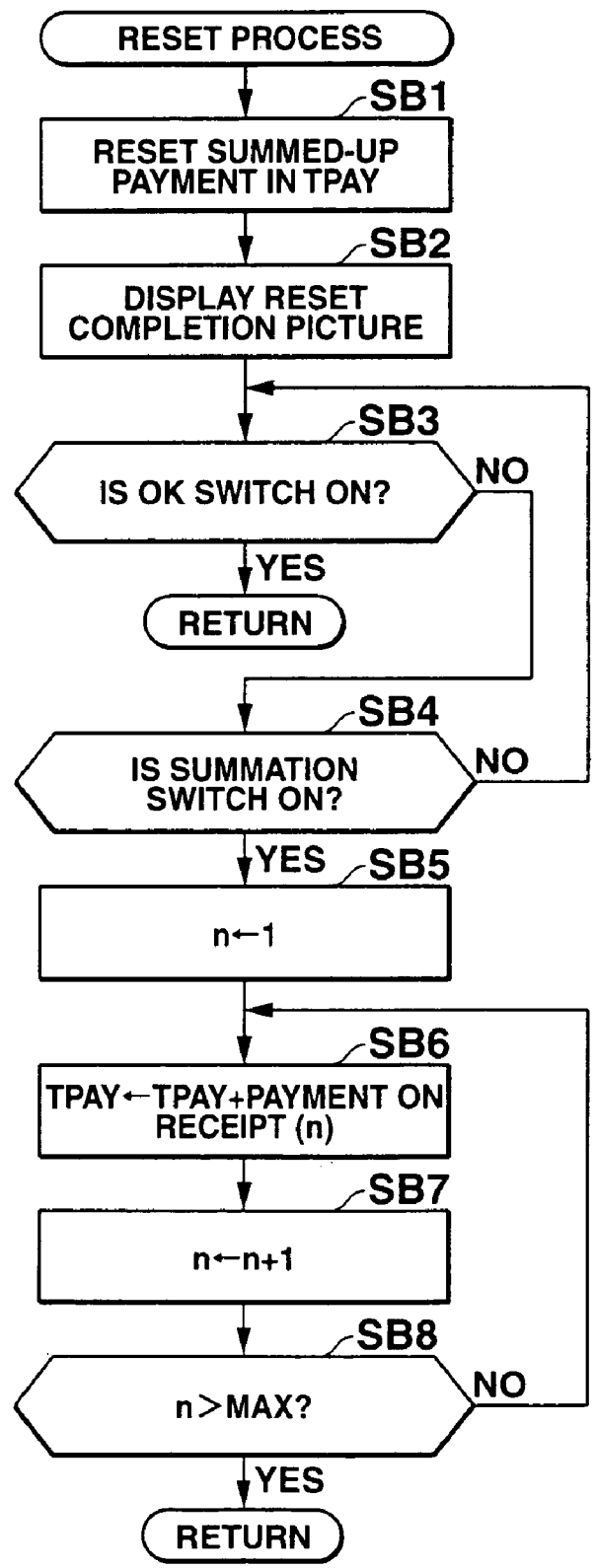
FIG. 7 is a flowchart indicative of a reset process of FIG. 5.

FIG. 7 is a flowchart indicative of the reset process in step SA51 of the FIG. 5 main routine. In this process, CPU 1 resets data on the sum of the payments stored in the register TPAY (step S B1), and then displays a reset completion picture (step SB2). Then, CPU 1 determines whether the OK switch is turned on (step SB3). If so, CPU 1 returns to the main routine and displays the receipt list picture in step SA27 of FIG. 4.

If the OK switch is not on in step SB3, CPU 1 determines whether the sum switch is turned on (step SB4). If so, CPU 1 sets a variable n to 1 (step SB5), specifies each of the receipt data, stored in the receipt database, in accordance with variable n, and then repeats a looping process of the steps SB6-SB8 while incrementing the value of the variable n. More particularly, CPU 1 adds a payment recorded on the receipt data n to that present in the register TPAY (step SB6), and then increments the value of n by one (step SB7). Then, CPU 1 determines whether the incremented value of n is larger than a maximum predetermined value (step SB8). If not, CPU 1 goes to step SB6, thereby repeating the looping process. If the value of n becomes greater than the maximum predetermined value in step SB8, or if the payments recorded on all the receipt data are summed up and stored as the whole sum in the register TPAY, CPU 1 returns to the main routine and then displays the receipt list picture in step SA27 of FIG. 4.

Figure 8:
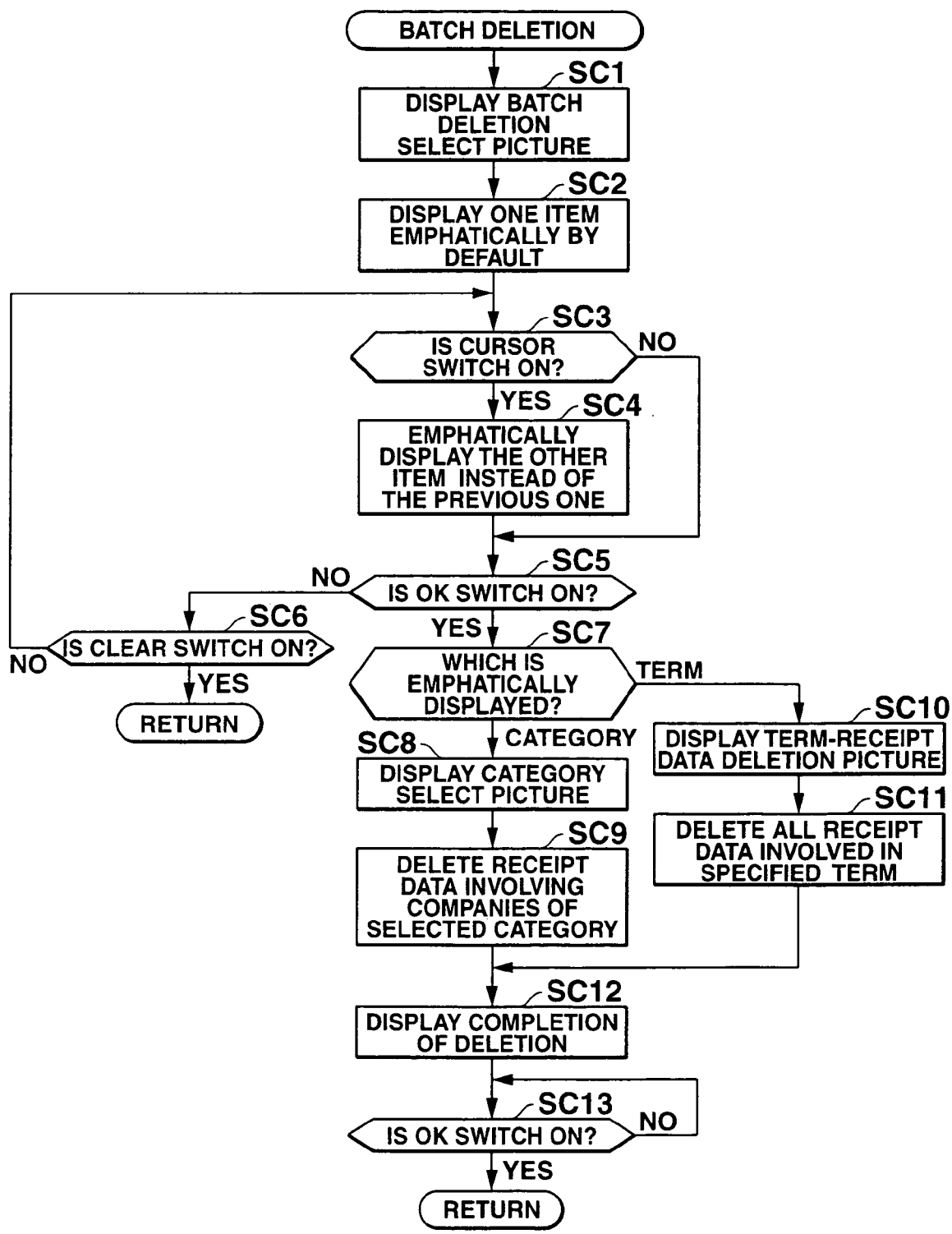
FIG. 8 is a flowchart of a batch deletion process of FIG. 5.

FIG. 8 is a flowchart indicative of the batch deletion process in step SA47 of FIG. 5. First, CPU 1 displays a batch deletion/selection picture (step SC1). This picture comprises a menu that includes two items of store receipt data deletion and term-receipt data deletion, and two icons of the OK switch and the clear switch. CPU 1 then emphatically displays one menu item by default (step SC2). CPU 1 then determines whether the cursor switch is turned on (step SC3). If so, CPU 1 emphatically displays the other item instead of the previous one (step SC4). Then, CPU 1 determines whether the OK switch is turned on (step SC5). If not, CPU 1 determines whether the clear switch is turned on (step SC6). If not, CPU 1 determines whether the cursor switch is turned on in step SC3. If the clear switch is turned on, CPU 1 returns to the main routine and displays the receipt list picture in step SA27 of FIG. 4.

When CPU 1 determines that the OK switch is turned on in step SC5 of FIG. 8, CPU 1 performs a deletion process depending on the emphatically displayed item. More particularly, CPU 1 determines which of company-category receipt data deletion and term-receipt data deletion the emphatically displayed item represents (step SC7). If it represents the former, CPU 1 displays a company-category receipt data deletion select picture (step SC8). This picture displays a menu of the categories of company including, for example, "convenience store", "fast food outlet", "video shop", "gas station", and "hotel". The user can select with the cursor switch companies of one of the categories whose receipt data is to be deleted and then delete the receipt data by operating the OK switch (step SC9).

When the emphatically displayed item represents term-receipt data deletion, CPU 1 displays a corresponding term-receipt data deletion picture (step SC10). This picture includes an area to which the start and end dates of a term for which the receipt data is to be deleted are inputted. When the user inputs alphanumeric characters representing the start and end dates of the term with the alphanumeric switch unit and then operates the OK switch, CPU 1 deletes all the receipt data involved in the term (step SC11).

After the receipt data is deleted in step SC9 or SC11, CPU 1 displays a deletion completion picture (step SC12) and then determines whether the OK switch is turned on (step SC13). If so, CPU 1 returns to the main routine and then displays the receipt list picture in step SA27 of FIG. 4.

Figure 9:
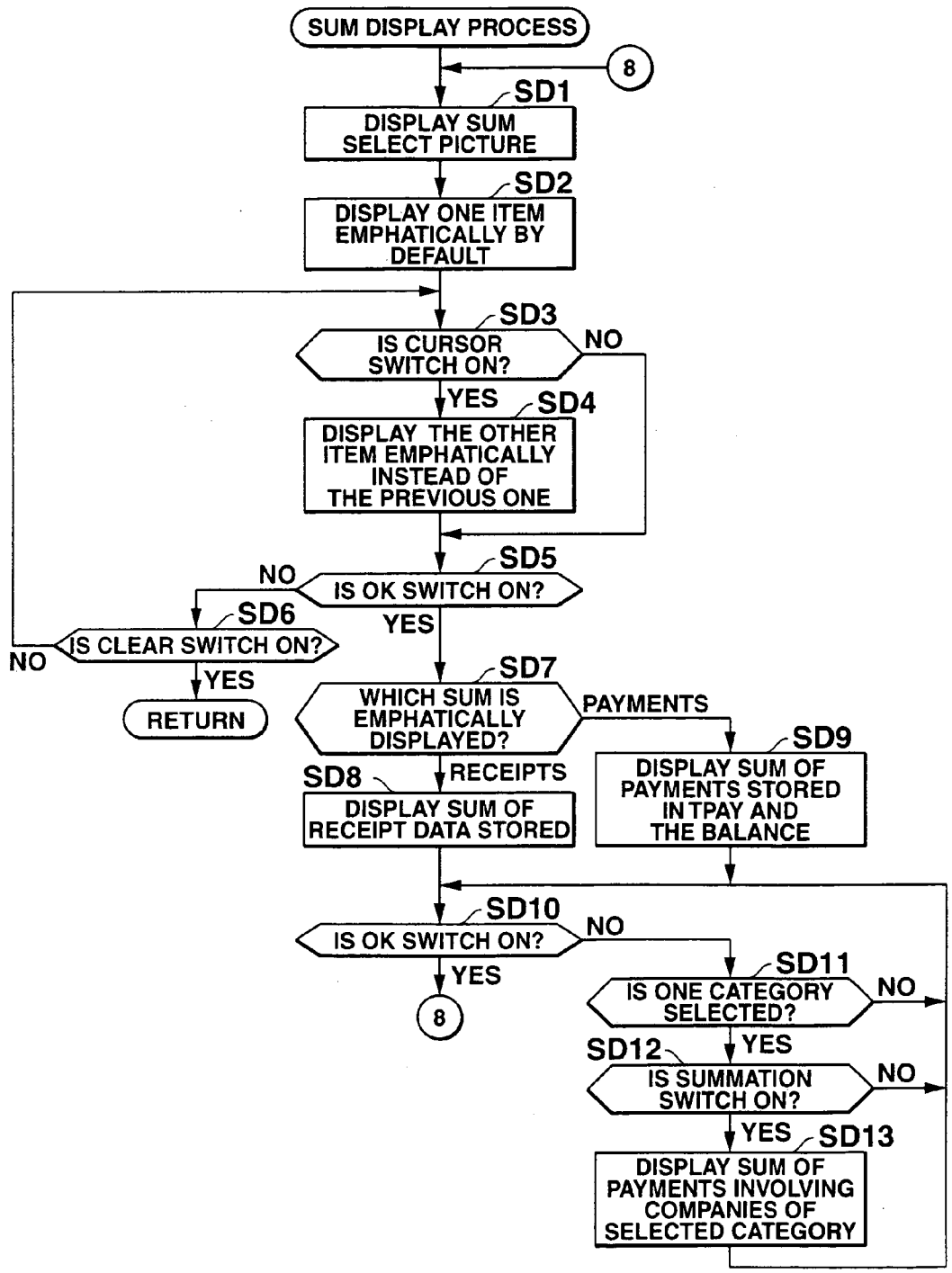
FIG. 9 is a flowchart of a sum display process of FIG. 5.

FIG. 9 is a flowchart indicative of the summation display process in step SA49 of the main routine of FIG. 5. First, CPU 1 displays a sum select picture (step SD1). This picture includes a menu of two items; i.e., the sum of receipts and the sum of payments and two icons of the OK switch and the clear switch. CPU 1 first displays a predetermined one of the two items emphatically by default (step SD2).

Then, CPU 1 determines whether the cursor switch is turned on (step SD3). If so, CPU 1 emphatically displays the other item instead of the previous one (step SD4). Then, CPU 1 determines whether the OK switch is turned on (step SD5). If not, CPU 1 then determines whether the clear switch is turned on (step SD6). If not, CPU 1 determines whether the cursor switch is turned on in step SD3. If the clear switch is turned on, CPU 1 returns to the main routine and displays the receipt list picture in step SA27 of FIG. 4.

When the OK switch is turned on in step SD5 of FIG. 9, CPU 1 determines which of the sum of the receipts and the sum of the payments is displayed emphatically (step SD7). If the former is displayed emphatically, CPU 1 displays the sum of receipts whose data is stored in the receipt sum register of RAM 3 (step SD8). If the sum of payments is emphatically displayed, CPU 1 displays the sum of payments whose data is in stored in the register TPAY of RAM 3 and the balance in the financial institution (step SD9). After this, CPU 1 determines whether the OK switch is turned on (step SD10). If so, CPU 1 again displays the sum select picture in step SD1.

If the OK switch is not turned on in step SD10, CPU 1 determines whether a specified one is selected by the cursor switch and the OK switch from among the categories of company that include for example, "convenience store", "fast food outlet", "video shop", "gas station" and "hotel" (step SD11). If so, CPU 1 determines whether the summation switch is turned on (step SD12). If so, CPU 1 calculates the sum of payments recorded on only the receipts involved in the companies of the selected category, and displays it on the display 12 (step SD13).

After this, or when no specified category is selected in step SD11 or the summation switch is not turned on in step SD12, CPU 1 determines whether the OK switch is turned on in step SD10. More particularly, when a specified category is selected and the summation switch is turned on in steps SD11-SD13, the sum of payments recorded on the receipts involved in the companies of the specified category can be displayed.

Figure 10:
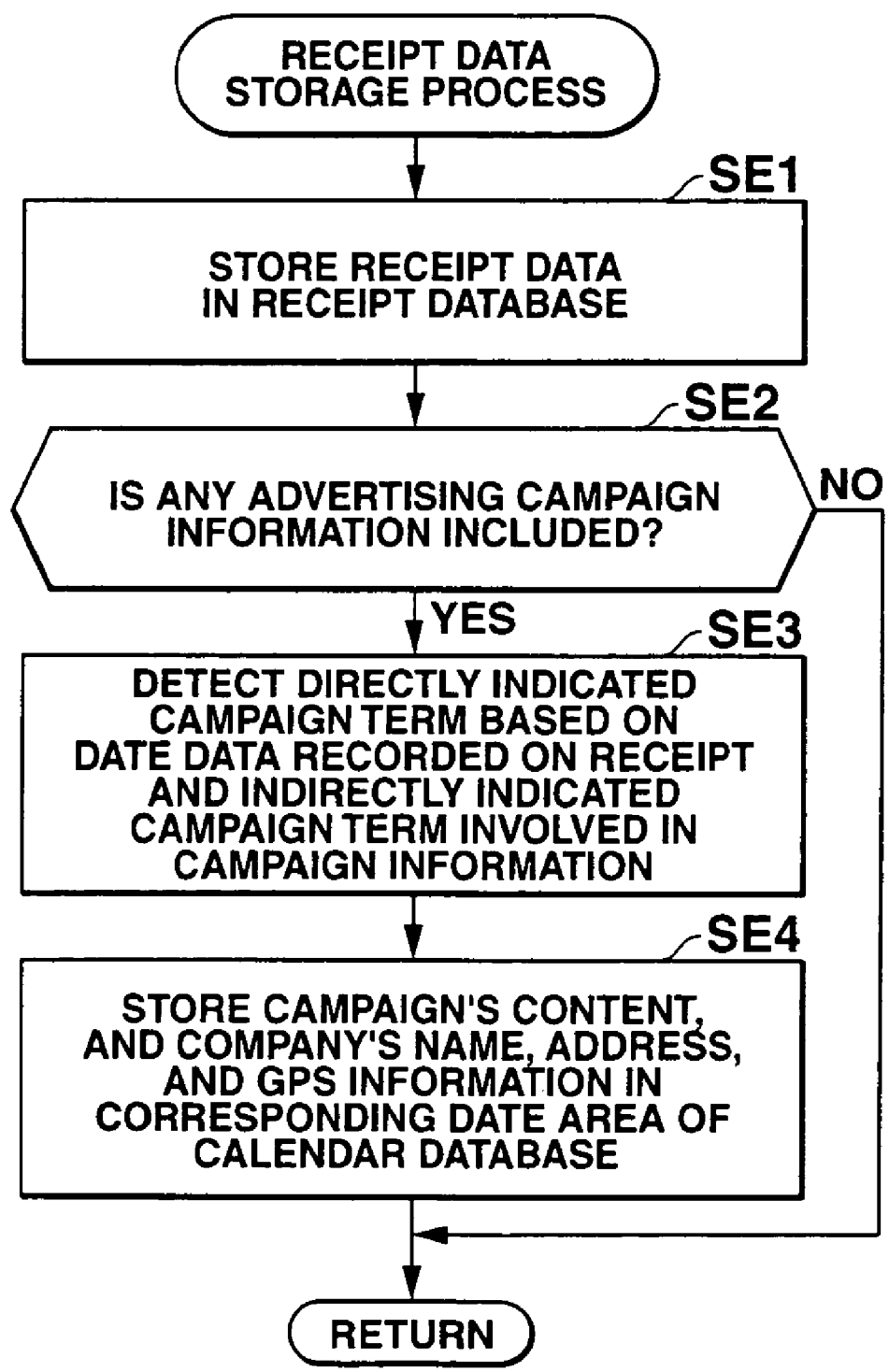
FIG. 10 is a flowchart of a receipt data storage process of FIG. 3.
Figure 11A:
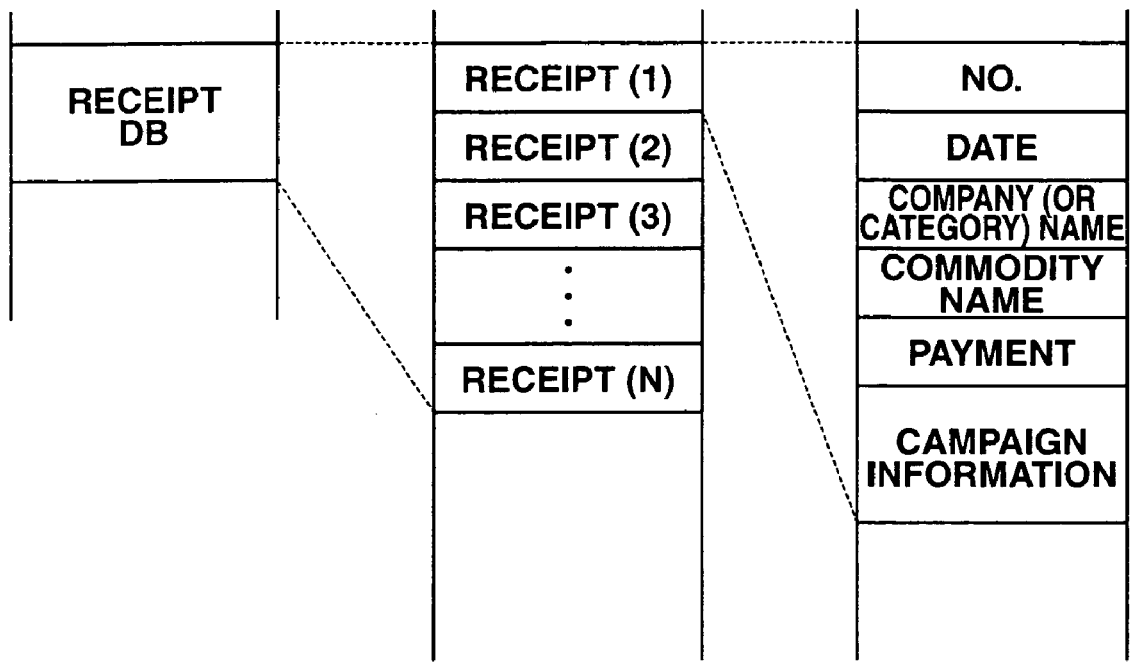
FIG. 11A and FIG. 11B illustrate the data content of a receipt database in a RAM of FIG. 1.
Figure 11B:
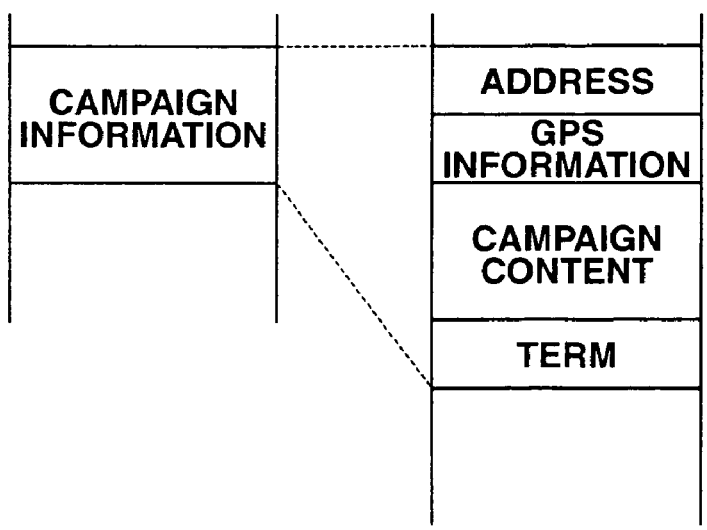

FIG. 10 is a flowchart indicative of the receipt data storage process to be performed in step SA19 of the FIG. 3 main routine. First, CPU 1 stores receipt data in the receipt database of RAM 3 (step SE1). FIG. 11 illustrates the content of the receipt database, which, as shown in FIG. 11 (a), has stored a plurality of receipt data (1)-(N) each of which includes receipt number, purchase date, company (or its category) name, commodity name, service name, and payment. If the company has some presently running advertising campaign, the receipt data also comprises its campaign information. As shown in FIG. 11 (b), the campaign information comprises the address of the company and GPS information representing its longitude and latitude, and the content and term of the campaign. The campaign term includes either a directly expressed term such as, for example, "until May 12" or an indirectly expressed term such as, for example, "until the end of this month" or "For 20 days or 2 weeks from this day".

Thus, after storing the receipt data in the receipt database in step SE1 of FIG. 10, CPU 1 determines whether the receipt data comprises some advertising campaign information (step SE2). If not, CPU 1 returns to the main routine. If so in step SE2 and the campaign term is indicated indirectly, CPU 1 detects a corresponding directly expressed campaign term from which the specified start and end dates can be confirmed based on the receipt date and the indirectly expressed campaign term (step SE3), and then stores the content of the campaign and the name, address and GPS information of the company in a corresponding date area of the calendar database (step SE4). Then, CPU 1 returns to the FIG. 3 main routine.

Figure 12:
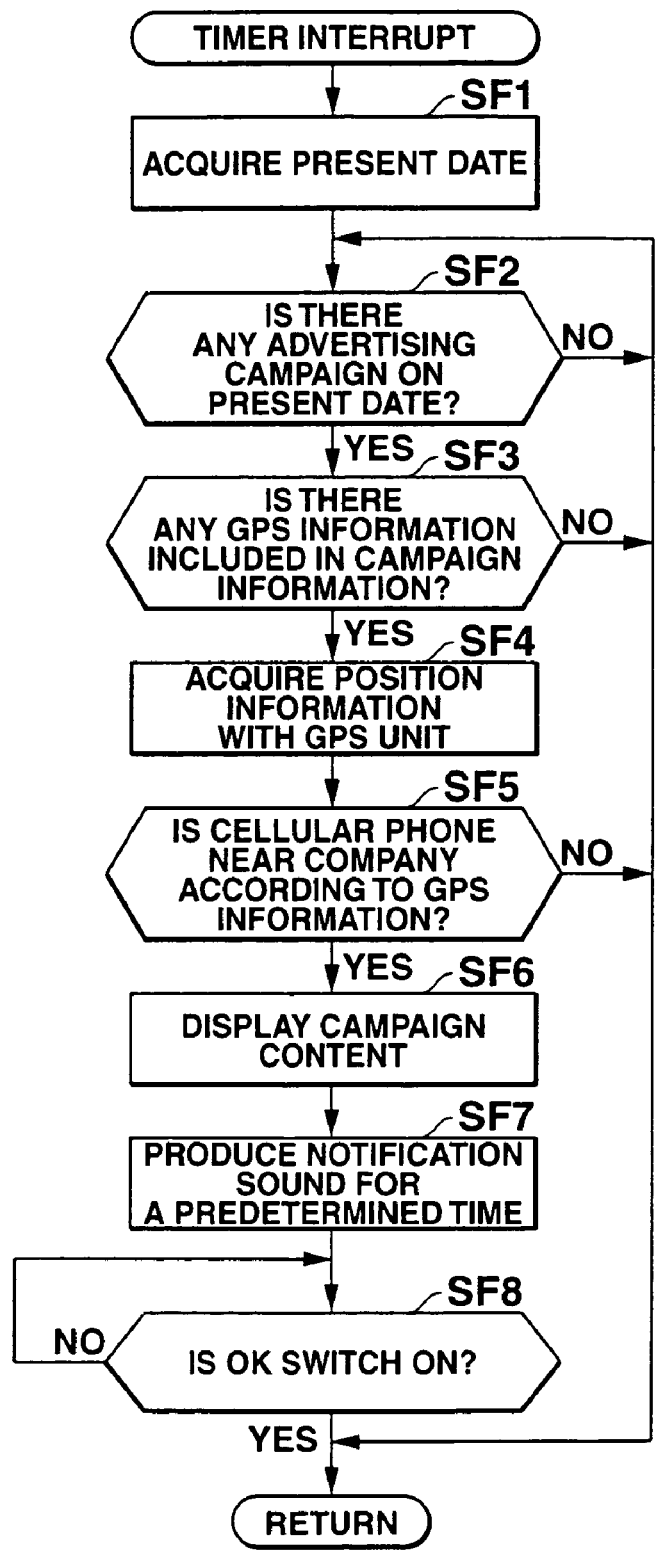
FIG. 12 is a flowchart indicative of a timer interrupt process to be performed in the first embodiment.

FIG. 12 is a flowchart indicative of a timer interrupt that occurs repeatedly at predetermined intervals of time. In this process, CPU 1 acquires the present date at predetermined intervals of time (step SF1), and then determines from the receipt data of that date whether there is some advertising campaign information involving the company at that date (step SF2). If so, CPU 1 determines whether the campaign information includes GPS information (step SF3). If so, CPU 1 acquires information on the position of the cellular phone from the GPS unit 7 (step SF4). Then, CPU 1 determines from the GPS information included in the campaign information and that acquired from the GPS unit whether the cellular phone is near the company (step SF5). If so, CPU 1 displays the content of the campaign information on the display 12 (step SF6) and then causes, for example, the speaker 9 to produce a sound that notifies the user of the presence of the campaign information for a predetermined time (step SF7). Then, CPU 1 determines whether the OK switch is turned on (step SF8). If so, CPU 1 returns to the main routine.

Figure 13:
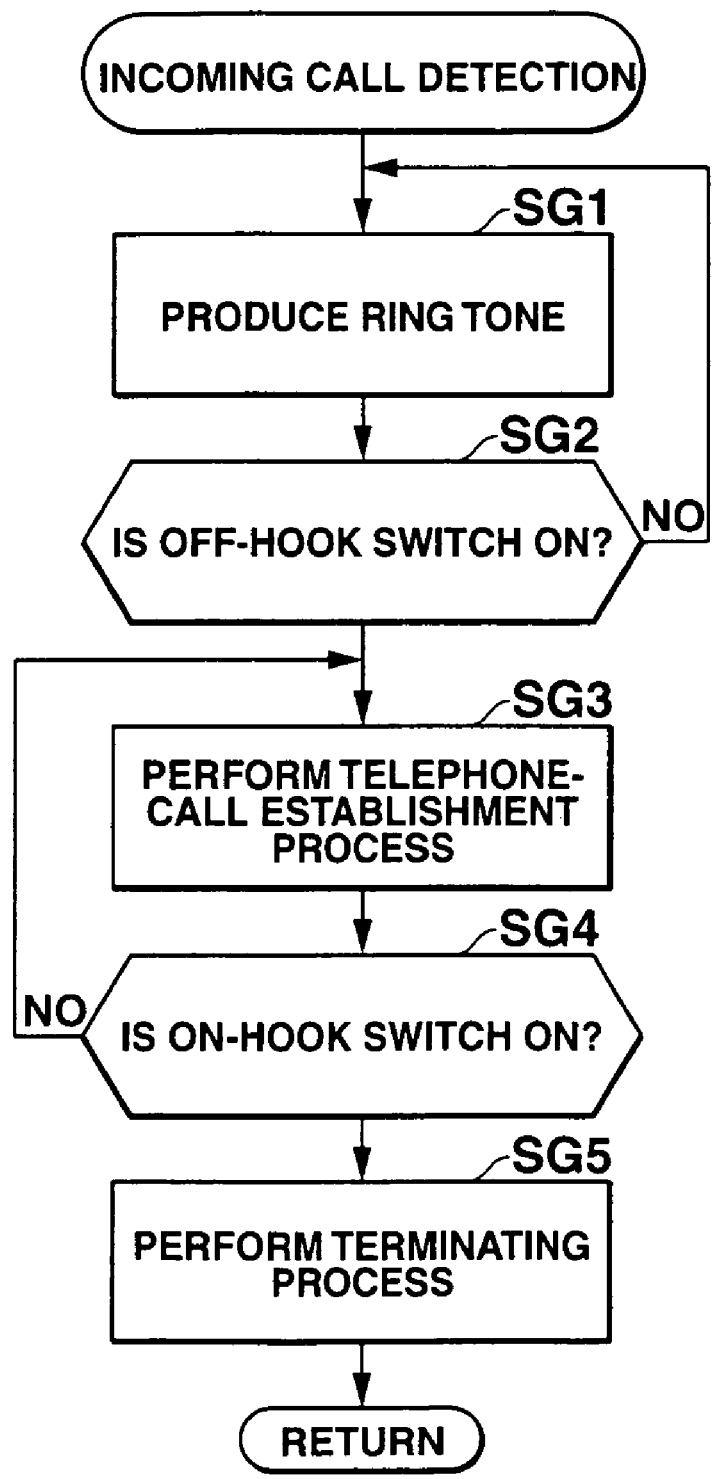
FIG. 13 is a flowchart indicative of an incoming call detection process to be performed in the first embodiment.

FIG. 13 is a flowchart indicative of an incoming-call detection process. If there is an incoming call when the power supply route POW 3 of FIG. 1 is alive and the RF block 4 is under operation, CPU 1 causes the speaker 9 to produce a sound that notifies the user of that fact (step SG1). Then, CPU 1 determines whether the off-hook switch is turned on (step SG2). If so, CPU 1 goes to a telephone-call establishment process such that the user can talk with the other party through the microphone 8 and the speaker 9 (step SG3). In the telephone-call establishment process, CPU 1 determines whether the on-hook switch is turned on (step SG4). If so, CPU 1 performs a terminating process including cutting the connection line (step SG5), returns to the main routine of FIG. 2 and then displays the wait picture.

Figure 14:
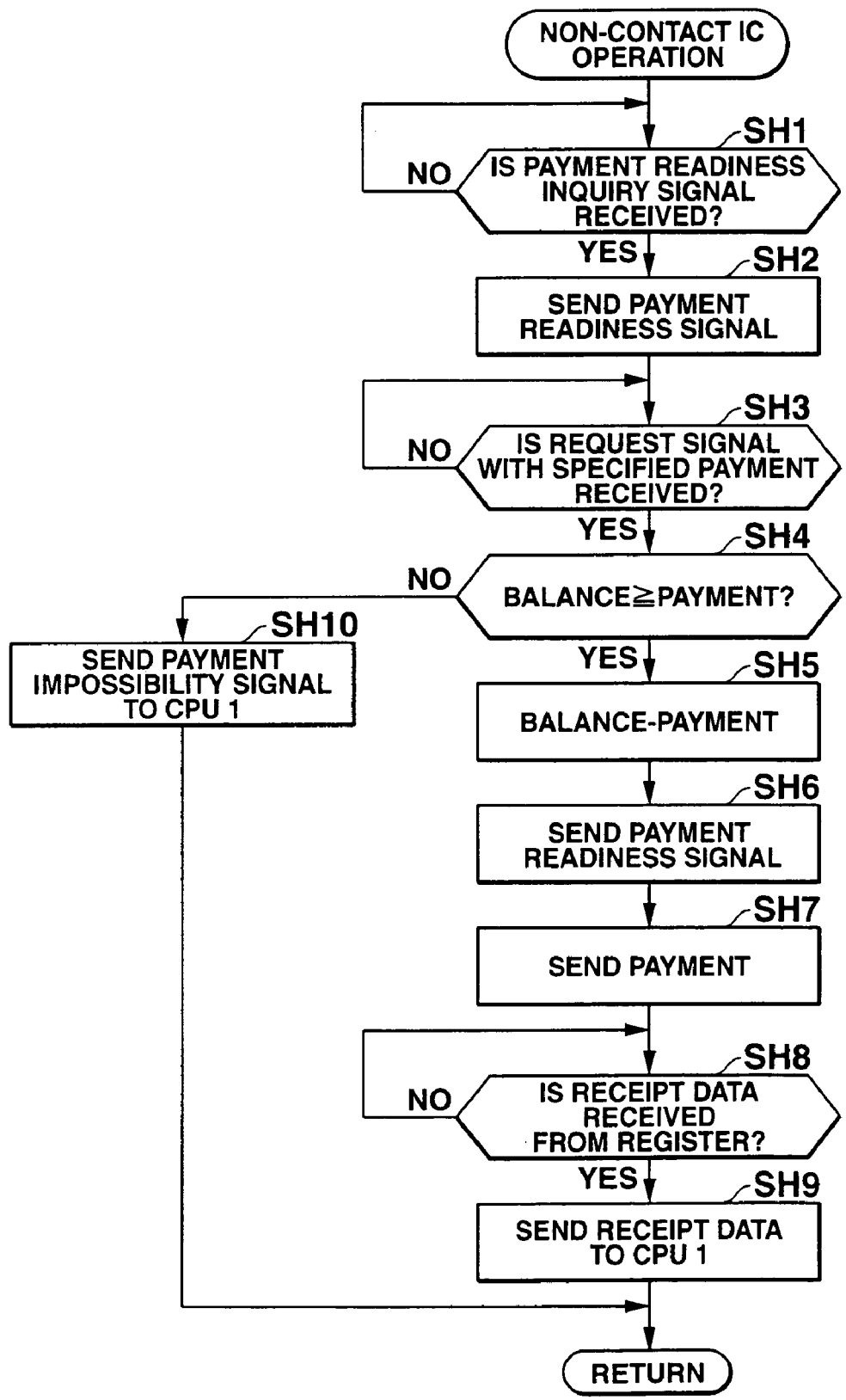
FIG. 14 is a flowchart indicative of operation of a non-contact IC in the FIG. 1 system.

FIG. 14 is a flowchart indicative of a payment process of the non-contact IC 10 to be performed in accordance with the communication control program stored in the program ROM. When the payment switch is turned on in step SA12 of the main routine to be performed by the cellular phone of FIG. 3, the non-contact IC 10 executes the payment process indicated by the FIG. 14 flowchart. First, the non-contact IC 10 communicates with the company's register 11 wirelessly, thereby determining whether a payment readiness inquiry signal inquiring whether the payment is ready is received from the register 11 (step SH1). If so, the non-contact IC 10 sends a payment readiness signal to the register 11 (step SH2). Then, the non-contact IC 10 determines whether a payment request signal is received from the register 11 (step SH3). If so, the non-contact IC 10 determines whether the deposit or balance at the financial institution whose balance data is stored in the data RAM is larger than the payment (step SH4).

If so, the payment is subtracted from the deposit (step SH5). Then, the non-contact IC 10 sends the register 11 a payment readiness signal (step SH6) and then data on the payment (step SH7). Then, the non-contact IC 10 determines whether the receipt data is received from the register 11 (step SH8). If so, the non-contact IC 10 sends the receipt data to CPU 1 of the cellular phone (step SH9).

If the non-contact IC 10 determines in step SH4 that the deposit is less than the payment, the non-contact IC 10 sends a payment impossibility signal to CPU 1 of the cellular phone (step SH10). After sending the receipt data in step SH9 or the payment impossibility signal in step SH10, the non-contact IC 10 stops its operation in step SA24 of the main routine of the cellular phone of FIG. 3.

Figure 15:
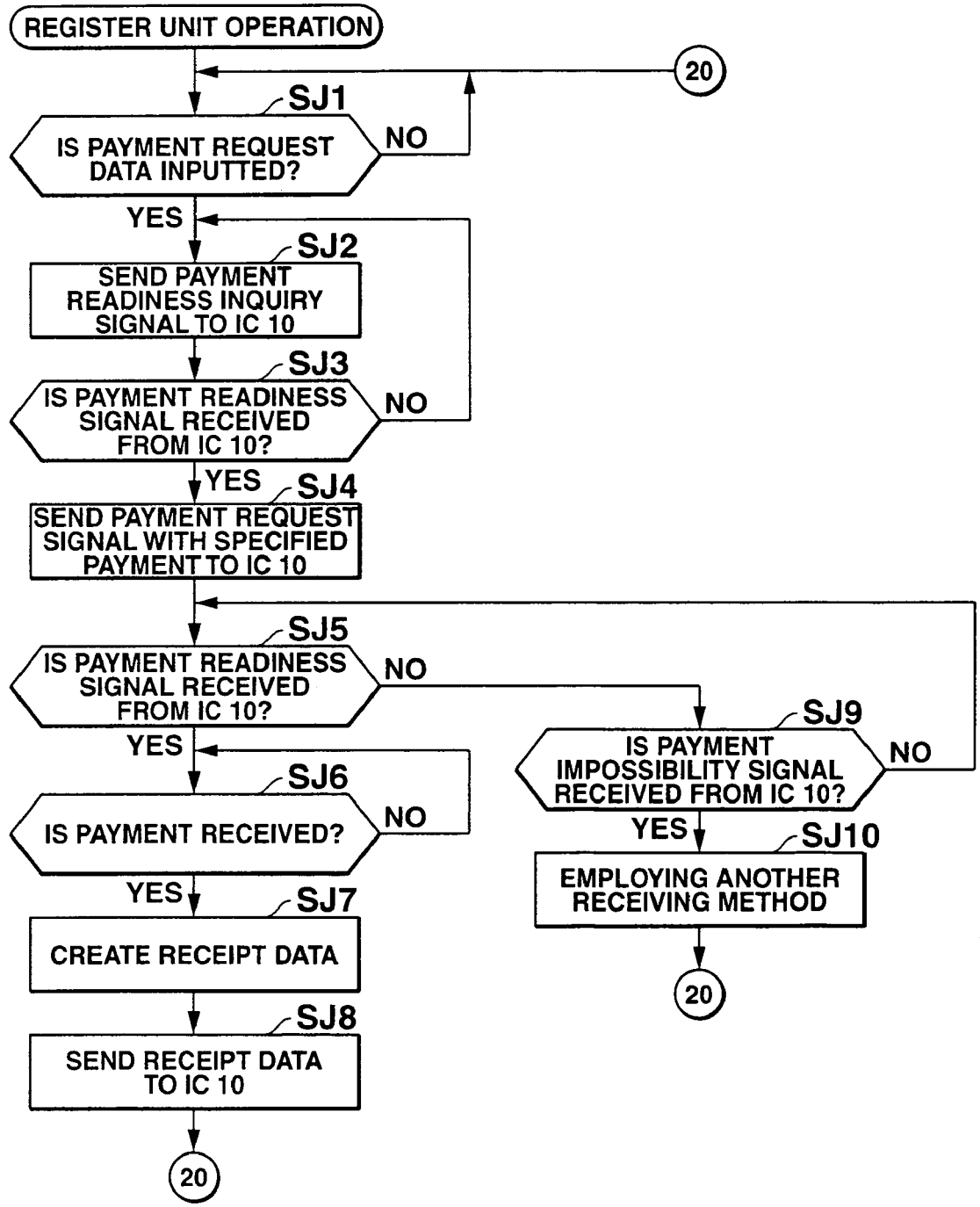
FIG. 15 is a flowchart indicative of operation of a register unit in the FIG. 1 system.

FIG. 15 is a flowchart indicative of wireless communication of the register 11 with the non-contact IC 10. The register 11 determines whether payment request data is inputted by an operator on the side thereof (step SJ1). If so, the register 11 sends the non-contact IC 10 a payment readiness inquiry signal inquiring whether the payment is ready (step SJ2). Then, the register 11 determines whether a payment readiness signal is received from the non-contact IC 10, indicating that the payment is ready (step SJ3). If so, the register 11 sends the non-contact IC 10 a payment request signal requesting payment of the specified sum of money (step SJ4). Then, the register determines whether a payment acceptance signal is received from the non-contact IC 10, indicating that the payment of the specified sum of money is accepted (step SJ5). If so, the register 11 determines whether data on a payment request that was sent by the non-contact IC 10 to the financial institution is received from the non-contact IC 10, the payment request comprising requesting the financial institution to pay the specified sum of money to the register 11, for example, in accordance with the account number of the IC 10 in the financial institution, the specified sum of money, and the account ID of the IC 10 user in the financial institution (step SJ6). When receiving this data, the register 11 prepares receipt data (step SJ7), and then sends it to the IC 10 (step SJ8).

When the payment acceptance signal is not received in step SJ5, the register 11 determines whether a payment impossibility signal is received (step SJ9). If so, the register 11 performs a cash-payment accepting process that includes accepting direct cash payment from the user of the cellular phone in this case (step SJ10).

After sending the receipt data in step SJ8 or performing the cash-payment accepting process in step SJ10, the register 11 waits for the operator to input another payment request data for another customer in step SJ1.

As described above, according to the first embodiment the non-contact IC 10 wirelessly performs an electronic payment process at the request of the company's register 11 about payment for the commodities and/or services that the cellular phone received from the company. When the RF block 4 detects an external incoming call while the non-contact IC 10 is not performing the payment process, CPU 1 goes to the telephone-call establishment process by performing the off-hook operation. When the RF block 4 detects the external incoming call while the non-contact IC 10 is performing the payment process, CPU 1 makes the power supply route POW 3 dead, thereby disabling the RF block 4, and inhibits CPU 1 from going to the telephone-call establishment process for the incoming call. Thus, the user's wireless payment to the store's register 11, using the non-contact IC 10 housed within the user's cellular phone, for the commodities and/or services received by the user from the company is protected from being hindered by the incoming call for the cellular phone.

This also applies to an incoming e-mail. That is, during the payment by the non-contact IC 10, CPU 1 is inhibited from going to the communication establishment process in which the cellular phone can communicate with the other party. If CPU 1 detects an external incoming mail when the non-contact IC 10 is not performing the payment process, CPU 1 goes to the communication establishment process for the incoming mail.

As shown in the flowchart of FIGS. 10 and 12 and in the receipt database of FIG. 11, according to the first embodiment when the receipt data received from the company register 11 comprises campaign information in the payment process performed by the non-contact IC 10, CPU 1 stores information on the position of the company and the campaign information in the receipt database of RAM 3. Then, CPU 1 determines whether the distance between the cellular phone or the IC 10 whose present position is detected by the GPS unit 7 and any company whose position data included in the receipt data stored in the receipt database is within a predetermined range. If so, CPU 1 displays on the display 12 campaign information on the company included in the receipt data.

When the cellular phone comes near the company that provides commodities and/or services, the cellular phone automatically knows the company's campaign information, and the user is able to use the information effectively. On the other hand, the company can enhance services provided for the customers and expand its business.

CPU 1 checks whether the present date falls within the campaign term included in the campaign information. If so, CPU 1 displays the campaign information. Thus, the user cannot inadvertently miss the campaign term and there is no possibility that the user will miss the chance to enjoy the campaign privilege.

Furthermore, CPU 1 stores in RAM 3 the campaign term data included in the campaign information that in turn is included in the receipt data received from the register 11, and then checks whether the present date falls within the campaign term. Thus, the user can use the company's campaign intentionally.

A modification of the first embodiment may comprise a memory that has stored map data set removably on the cellular phone. Alternatively, the cellular phone may be arranged to receive map data indicative of the present position of the cellular phone detected by the GPS unit 7 and the position of the company via the RF block 4 from an external server. Even in any of these modifications, CPU 1 is capable of displaying the campaign information along with map data indicative of the present position of the cellular phone and the position of the company. Thus, the user can visit the company that performs the campaign without losing himself or herself.

As a further modification, a server that includes a customer database may be connected to the company register 11 such that the campaign information is e-mailed to the respective customers in accordance with their mail addresses registered in the customer database. Furthermore, in this case the server may be arranged to access the base station for the cellular phones such that if the customer who is near the company is ascertained by the base station based on the customers' telephone number registered in the customer database, the server can e-mail the campaign information and the map data to the customer's cellular phone. In this case, the service provided to the customer is further improved, thereby expanding the company's business.

As shown in the flowchart of FIG. 8, according to the first embodiment when the non-contact IC 10 performs the electronic payment process wirelessly at the request of the company register 11 for the commodities and/or services provided by the company, CPU 1 stores the receipt data, involved in the payment process that the non-contact IC 10 has received from the register 11, in the receipt database of RAM 3. Then, each time CPU 1 stores receipt data, CPU 1 adds the payment included in the receipt data to the previous payment data present in the register TPAY of RAM 3, thereby storing data on a resulting sum of payments in the register TPAY of RAM 3. In response to a receipt deletion command inputted by the cursor switch and OK switch, CPU 1 deletes the receipt data stored in the receipt database of RAM 3. In response to a sum-of-payments deletion command inputted by the cursor switch and the OK switch, CPU 1 also deletes data on the sum of payments stored in the register TPAY of RAM 3. It is noted that the receipt data and the sum of payments data are deleted by the respective different switches.

Thus, when an empty area of RAM 3 is reduced excessively by storing receipt data accumulatively in RAM 3, the receipt data whose content is already confirmed and need not be preserved can be deleted excluding data on the sum of the payments such that the emptied area of RAM 3 can be used for storage of new receipt data.

As shown in the FIG. 8 flowchart, after a receipt data deletion term is specified by the cursor switch and the OK switch is then depressed, CPU 1 deletes the receipt data or data on the sum of payments for the specified term. Thus, receipt data for a term that need not be preserved for the user can be specified and deleted. For example, when household accounts are kept at the beginning of each month, the sum of payments for the previous month can be transferred to the household account book and then the previous-month term can be specified, thereby deleting associated receipt data. Thus, the RAM 3 area is prevented from being occupied with unnecessary receipt data for the user.

Also, as shown in the flowchart of FIG. 8, when a particular company category is specified by the cursor switch and then the OK switch is depressed CPU 1 deletes receipt data involving the companies of the specified category. Thus, all receipt data for the companies of any particular category unnecessary for the user to hold can be selected and deleted. For example, when the user stayed in a hotel on company business and paid for his or her hotel charge, the user is required to submit the receipt to his or her work place for account settling purposes. In this case, the user can hold the receipt data involving the company business and delete receipt data involving his or her private business, for example, due to private shopping at convenience stores.

As shown in the flowchart of FIG. 7, when the summation switch is operated after CPU 1 has deleted part of the receipt data in the receipt database of RAM 3 and the summed-up payment data in the register TPAY, CPU 1 sums up the payments included in the remaining receipt data in the receipt database and stores it as new summed-up payment data in the register TPAY. Thus, CPU 1 can leave only necessary data selected from the receipt data stored in the receipt database, and then calculate the sum of payments involved in the remaining receipt data. For example, when company and private receipt data are held mixed in the receipt database, CPU 1 can delete the latter data and hold only the sum of payments included in the former receipt data.

Alternatively, as shown in the FIG. 9 flowchart, CPU 1 can select data on companies of a specified category from among the receipt data held in the receipt database with the cursor switch and the OK switch and then displays on the display 12 the sum of payments included in the receipt data involving the companies by operating the summation switch.

Operation of the second embodiment having the same structure as the first embodiment as shown in FIG. 1 will be described with a reference to FIGS. 16 and 17. The second embodiment is different from the first embodiment only in part of the main routine to be performed by CPU 1 and in the process for detecting the incoming call or mail. Thus, the operation of the second embodiment will be described using the Figures used for description of the first embodiment as needed.

Figure 16:
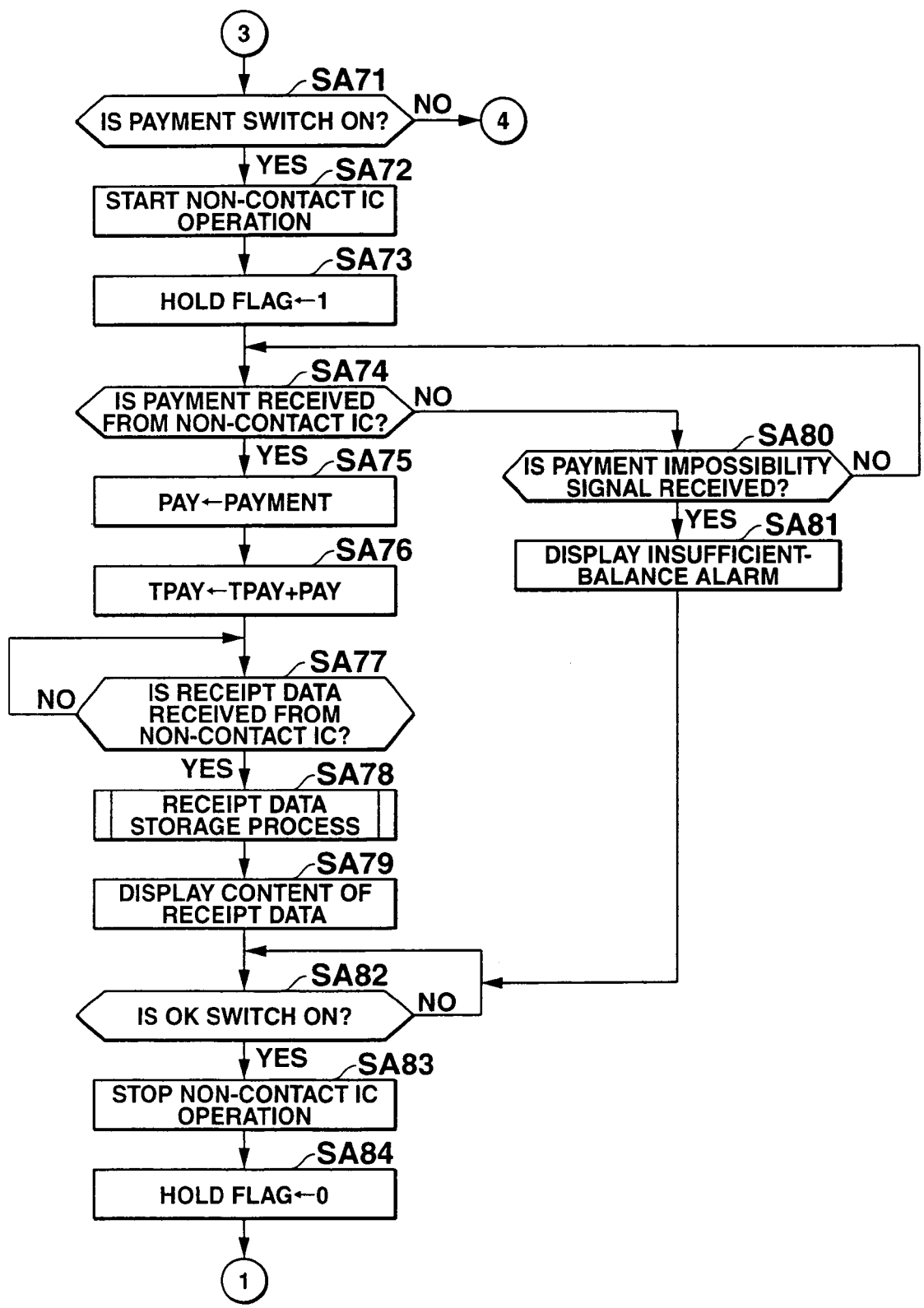
FIG. 16 is a flowchart indicative of a part of a main routine to be performed by the cellular phone in the second embodiment.

FIG. 16 corresponds to FIG. 3 indicative of part of the main routine performed by the first embodiment. When the off-hook switch is not on in step SA3 of FIG. 2, CPU 1 determines whether the payment switch is turned on in step SA71 in FIG. 16. If so, CPU 1 causes POW 2 to be alive, thereby starting the operation of the non-contact IC 10 (step SA72), and then sets the hold flag to 1 (step SA73).

Then, CPU 1 determines whether payment data has been received from the non-contact IC 10 (step SA74). If so, CPU 1 stores the payment data in the register PAY of RAM 3 (step SA75). Furthermore, CPU 1 adds the payment data in the register PAY to that stored in the register TPAY, thereby updating data on the sum of payments (step SA76). Then, CPU 1 determines whether receipt data is received from the non-contact IC 10 (step SA77). If so, CPU 1 performs a received-data storage process (step SA78) and then displays the content of the receipt data (step SA79). When no payment data is received from the non-contact IC 10 in step SA74, CPU 1 determines whether a payment impossibility signal is received (step SA80). If so, CPU 1 displays an alarm that alerts the user to an insufficient balance remaining at the financial institution (step SA81).

After displaying the content of the receipt data in step SA79 or the alarm indicative of the insufficient balance in step SA81, CPU 1 determines whether the OK switch is turned on (step SA82). If so, CPU 1 stops the operation of the non-contact IC 10 (step SA83), resets the hold flag to 0 (step SA 84) and then goes to step SA 2 of FIG. 2, thereby displaying the wait picture.

Figure 17:
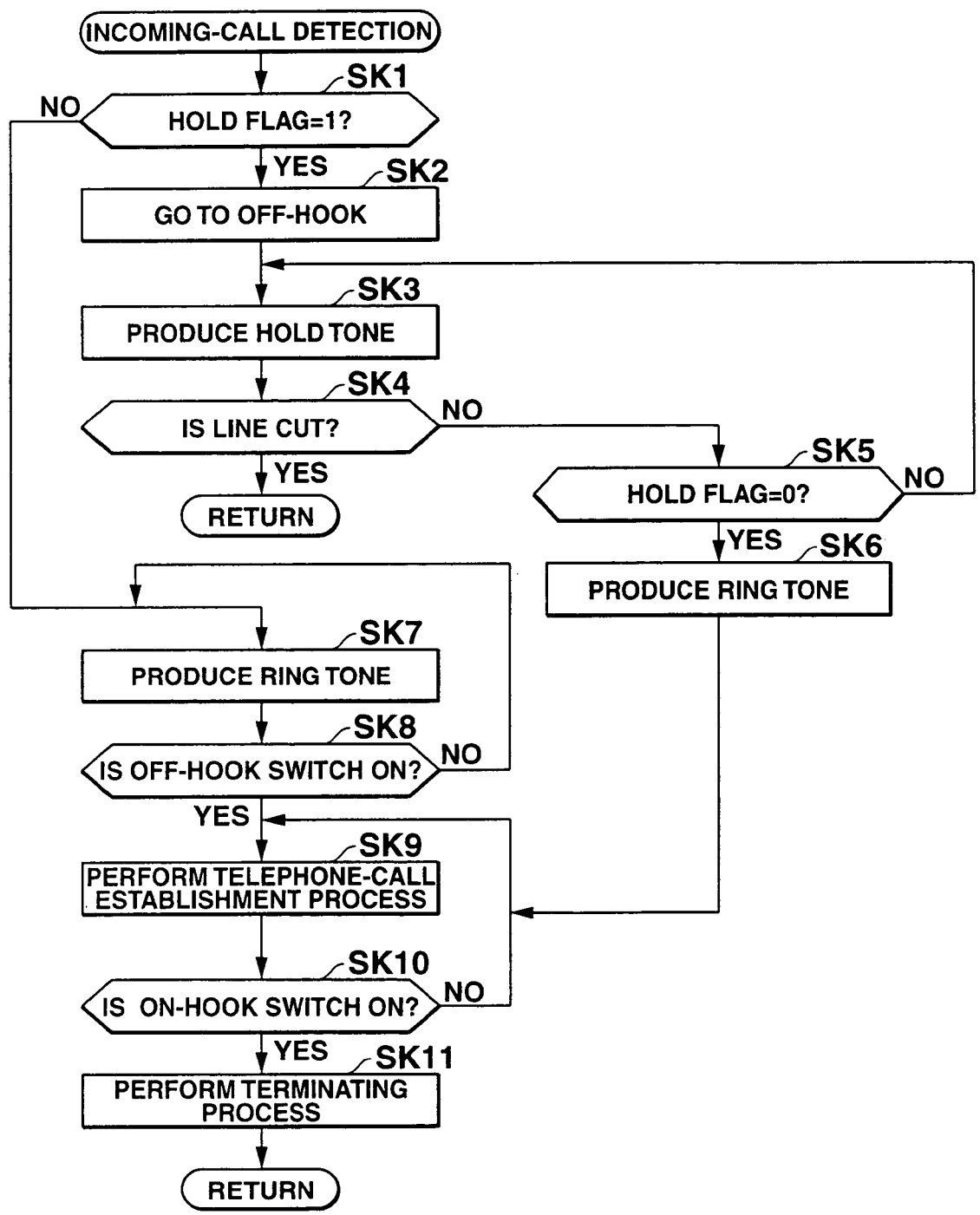
FIG. 17 is a flowchart indicative of an incoming-call detection process to be performed in the second embodiment.

FIG. 17 is a flowchart indicative of an incoming call detection process to be performed by the cellular phone in the second embodiment. When the RF block 4 detects an incoming call, CPU 1 performs the incoming call detection process. First, CPU 1 determines whether the hold flag is 1 (step SK1). If so, CPU 1 goes to off-hook, thereby performing an auto-answering process (step SK2). CPU 1 then sends the other party either a hold tone or a message such as, for example, "I cannot answer the phone now. Please hold for a while, otherwise call me again." (step SK3). Then, CPU 1 determines whether the connection line is cut by the other party's on-hook operation (step SK4). If so, CPU 1 returns to the main routine.

When the connection line is not cut, or the other party is waiting for the user to talk by telephone with him or her without going to on-hook, CPU 1 determines whether the hold flag is reset to 0 (step SH5). If so, or the hold flag is reset in step SA84 of FIG. 16 after the electronic payment by the non-contact IC 10 is terminated, the speaker 9 produces a ring tone only for a predetermined time, notifying the user that the other party is waiting for talking with the user (step SK6).

When the hold flag is 0 in step SK1, or while the electronic payment process is not being performed by the non-contact IC 10, CPU 1 causes the speaker 9 to produce a ring tone (step SK7). Then, CPU 1 determines whether the off-hook switch is turned on (step SK8). If so, or after CPU 1 cause the speaker 9 to produce the ring tone that notifies that the other party is waiting for the user for talking purposes in step SK6, CPU 1 goes to the telephone-call establishment process (step SK9). In this process, CPU 1 determines whether the on-hook switch is turned on (step SK10). If so, CPU 1 performs the terminating process including cutting the connection line (step SK11) and then returns to the main routine.

As described above, according to the second embodiment the RF block 4 of the cellular phone detects an external incoming call or mail via the communication line. The non-contact IC 10 performs the electronic payment process that includes paying the company for the commodities and/or services the user received from it. If CPU 1 detects an external incoming call or e-mail through the RF block 4 when the non-contact IC 10 is not performing the payment process, CPU 1 goes to the telephone-call or communication establishment process in accordance with the off-hook operation responding to the incoming call. While the non-contact IC 10 is performing the payment process, CPU 1 automatically answers an external incoming call or mail, produces a hold tone, sends it to the other party, and prevents the incoming call or communication establishment process for the incoming call or mail from being interrupted.

Thus, as in the first embodiment a wireless electronic payment to the company for the commodities and/or services received by the user of the cellular phone through the non-contact IC 10 housed within the user's cellular phone and the company's register 11 is not hindered by the incoming call or mail for the cellular phone.

Figure 18:
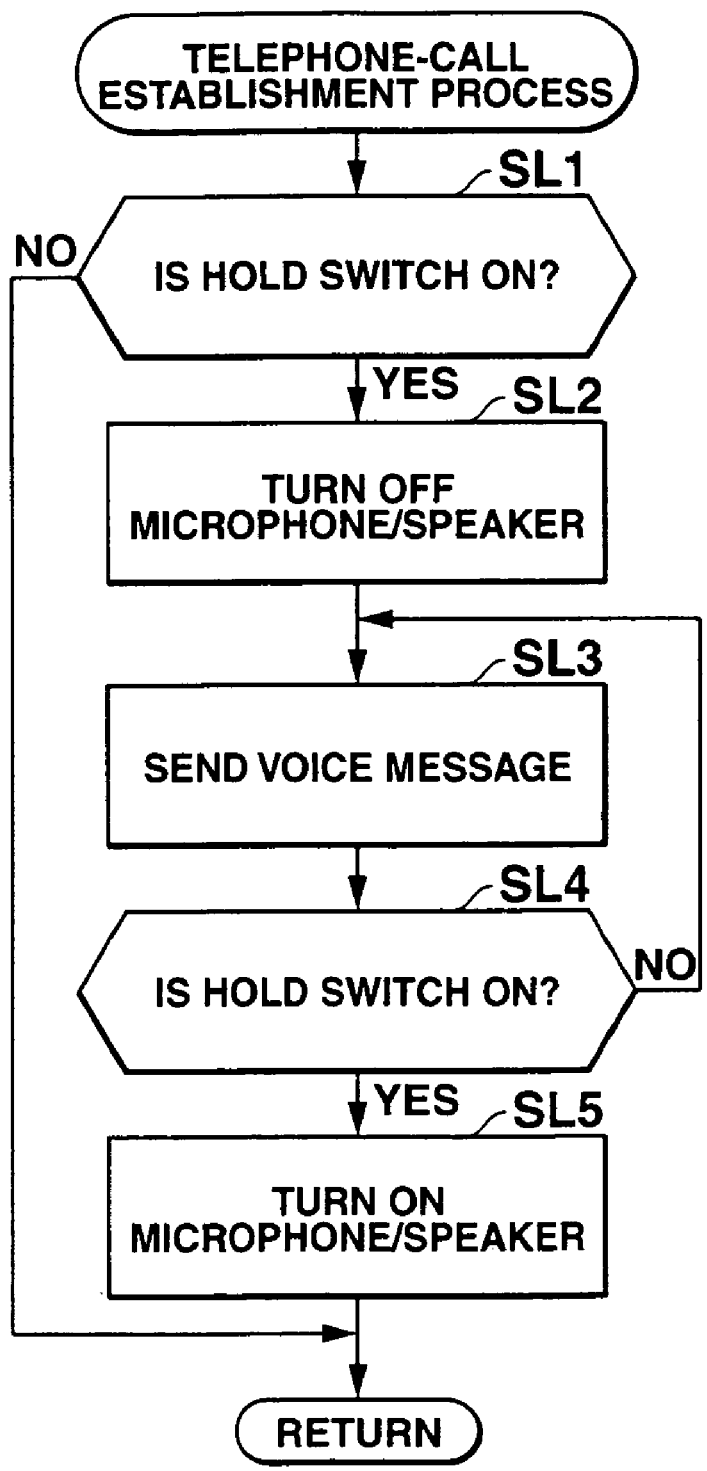
FIG. 18 is a flowchart indicative of a telephone-call establishment process of a main routine to be performed in the third embodiment.

A telephone-call establishment process of the third embodiment based on the arrangement of FIG. 1 will be described with reference to FIG. 18. This process is different from that to be performed in step SA9 of FIG. 2 in the main routine of each of the first and second embodiments. The third embodiment relates to the case where the non-contact IC 10 performs the electronic payment process while the user of the cellular phone is talking with the other party over the cellular phone. For example, if the user receives from the company's register 11 a signal inquiring whether the user's payment is ready while the user is talking within the company with the other party over his or her cellular phone, the user cannot any longer continue to talk with the other party. FIG. 18 is a flowchart indicative of a telephone-call establishment process to be performed in such a case. CPU 1 determines whether the hold switch is depressed (step SL1). If so, CPU 1 turns off or mutes the microphone 8 and the speaker 9 (step SL2), and then sends a voice message or a melody tone to the other party (step SL3). During sending the voice message or melody tone, CPU 1 again determines whether the hold switch is depressed on (step SL4). If so, CPU 1 releases the microphone 8 and the speaker 9 from its off or mute state and then goes to the normal telephone-call establishment process again.

As described above, according to the third embodiment when the hold switch is depressed in a talk enable state, in which the user can talk over his or her cellular phone with the external other party, the cellular phone goes from the talk enable state to the hold state and then sends a voice message to the other party. CPU 1 also responds to depression of the hold switch in the hold state to cause the cellular phone to return from the hold state to the talk enable state. More particularly, when the user receives from the register 11 a signal inquiring whether the user is ready to pay during the user is talking with the other party over the cellular phone, the user depresses the hold switch, thereby bringing the cellular phone to the hold state, and then sends a voice message to the other party. Then, CPU 1 causes the non-contact IC 10 to perform the electronic payment process. When terminating the payment process, CPU 1 again depressed the hold switch, thereby reopening the talking.

Thus, as in the first embodiment the payment of the user to the company for the commodities and/or services that the user received from the company, through the non-contact IC 10 of the cellular phone and the company's register 11 is not hindered by an incoming call or mail for the cellular phone.

While in the respective embodiments the inventive communications terminal is illustrated in the form of the cellular phone, the present invention is not limited to the above embodiments. The present invention is also applicable to communications terminals such as PHSs and/or PDAs in addition to the cellular phones. The present invention is furthermore applicable to miniaturized portable electronic devices such as calculators that houses a non-contact IC therein. Briefly, the present invention is applicable to every small electronic device capable of performing an electronic payment process that includes paying for the commodities and/or services, which the user of the cellular phone received from the company, to the same using the non-contact IC housed within the cellular phone.

The electronic paying means that wirelessly performs the electronic payment process is not limited to the non-contact IC 10 of the embodiment. For example, IC cards, magnetic cards or other devices that are capable of performing the electronic payment process in a non-contact manner may be used as the electronic paying means.

While in the respective embodiments the communications terminals whose CPU 1 executes the communication control program beforehand stored in ROM 2 have been illustrated, such communication control program may be downloaded from an external server via a network by the RF block 4 or stored on an external recording medium from the connection terminals of the cellular phone over an USB interface and installed in an non-volatile rewritable memory.

Various modifications and changes may be made without departing from the broad spirit and scope of this invention. The above-described embodiments are intended to illustrate the present invention, and not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A communications terminal comprising:
   means for detecting at least one of an incoming call and an incoming email from an external party;
   paying means for wirelessly and electronically performing a paying process to pay a commercial enterprise that has provided at least one of commodities and services to a user of the communications terminal, in accordance with a request from the commercial enterprise;
   control means for: (i) causing the communications terminal to execute a communication establishment process between the communications terminal and the external party, responsive to the detecting means detecting one of the incoming call and the incoming email from the external party when the paying means is not performing the paying process, and (ii) inhibiting the communications terminal from executing the communication establishment process, responsive to the detecting means detecting one of the incoming call and the incoming email when the paying means is performing the paying process;
   a storage device that comprises a first storage area and a second storage area;
   second control means for: (i) storing, in the first storage area, receipt data corresponding to the paying process, which is received from the commercial enterprise in the paying process performed by the paying means, and (ii) for accumulatively storing, in the second storage area, payment data included in the receipt data when the receipt data is stored in the first storage area; and
   data deleting means for deleting part of the receipt data stored in the first storage area in accordance with a first delete command and for deleting the payment data accumulatively stored in the second storage area in accordance with a second delete command.

2. The communications terminal of claim 1, wherein the data deleting means deletes receipt data corresponding to a specified time period.

3. The communications terminal of claim 1, wherein the data deleting means deletes receipt data corresponding to all commercial enterprises belonging to a specified commercial-enterprise.

4. The communications terminal of claim 1, wherein after the part of receipt data stored in the first storage area and the payment data accumulatively stored in the second storage area are deleted by the data deleting means, the second control means sums up, in accordance with a summation command, payments corresponding to receipt data stored in the first storage area that have not been deleted, and the second control means stores payment data representing the summed-up payments in the second storage area.

5. The communications terminal of claim 1, further comprising:
   means for selecting a category of commercial enterprises from among categories of commercial enterprises from which the receipt data stored in the first storage area has been received; and
   means for displaying on a display a summed-up payment representing a summed-up total of payments in the receipt data received from commercial enterprises in the specified category.

6. A communication control method comprising:
   wirelessly and electronically performing a paying process using a communications terminal to pay a commercial enterprise that has provided at least one of commodities and services to a user of the communications terminal, in accordance with a request from the commercial enterprise;
   detecting one of an incoming call and an incoming e-mail from an external party, and responsive to detecting one of the incoming call and the incoming e-mail: (i) when the paying process is not being performed, causing the communications terminal to execute a communication establishment process between the communications terminal and the external party, and (ii) when the paying process is being performed, inhibiting the communications terminal from executing the communication establishment process;
   storing, in a first storage area of a storage device of the communications terminal, receipt data corresponding to the paying process, which is received from the commercial enterprise in the paying process;
   accumulatively storing, in a second storage area of the storage device, payment data included in the receipt data when the receipt data is stored in the first storage area; and
   deleting part of the receipt data stored in the first storage area in accordance with a first delete command, and deleting the payment data accumulatively stored in the second storage area in accordance with a second delete command.

7. A computer-readable storage medium having a program stored thereon that is executable by a CPU of a communications terminal, wherein the communications terminal comprises means for detecting one of an incoming call and an incoming e-mail from an external party and a storage device including a first storage area and a second storage area, said program being executable by the CPU to cause the CPU to perform functions comprising:
   controlling the communication terminal to wirelessly and electronically perform a paying process to pay a commercial enterprise that has provided at least one of commodities and services to a user of the communications terminal, in accordance with a request from the commercial enterprise;

responsive to the detecting means detecting one of the incoming call and the incoming e-mail: (i) when the paying process is not being performed, causing the communications terminal to execute a communication establishment process between the communications terminal and the external party, and (ii) when the paying process is being performed, inhibiting the communications terminal from executing the communication establishment process;

storing, in the first storage area of the storage device, receipt data corresponding to the paying process, which is received from the commercial enterprise in the paying process;

accumulatively storing, in the second storage area of the storage device, payment data included in the receipt data when the receipt data is stored in the first storage area; and deleting part of the receipt data stored in the first storage area in accordance with a first delete command, and deleting the payment data accumulatively stored in the second storage area in accordance with a second delete command.

* * * * *